(12) United States Patent
Koyano et al.

(10) Patent No.: US 7,043,131 B2
(45) Date of Patent: *May 9, 2006

(54) OPTICAL DEVICE AND A MAKING METHOD THEREOF

(75) Inventors: Yasushi Koyano, Kanagawa (JP); Eisuke Sasaoka, Kanagawa (JP); Shigeru Tanaka, Kanagawa (JP); Kohei Kobayashi, Kanagawa (JP); Masashi Onishi, Kanagawa (JP); Kenji Tamano, Kanagawa (JP); Takashi Fujii, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 177 days.

This patent is subject to a terminal disclaimer.

(21) Appl. No.: 10/217,433

(22) Filed: Aug. 14, 2002

(65) Prior Publication Data

US 2004/0013395 A1    Jan. 22, 2004

Related U.S. Application Data

(60) Division of application No. 09/477,561, filed on Jan. 4, 2000, now Pat. No. 6,650,821, which is a continuation-in-part of application No. 09/240,690, filed on Feb. 2, 1999, now Pat. No. 6,546,180.

(30) Foreign Application Priority Data

Jan. 6, 1999   (JP) .................................. 11-001129
Sep. 16, 1999  (JP) .................................. 11-262281

(51) Int. Cl.
    *G02B 6/00*   (2006.01)
(52) U.S. Cl. ..................... 385/136; 385/128; 385/135; 385/141
(58) Field of Classification Search ................ 385/123, 385/128, 141, 146, 147, 134–136, 148
    See application file for complete search history.

(56) References Cited

U.S. PATENT DOCUMENTS 4,703,997 A * 11/1987 Ijiri et al. ................... 385/109

(Continued)

FOREIGN PATENT DOCUMENTS

EP          0 391 557 A2   10/1990

(Continued)

OTHER PUBLICATIONS

"Temperature Dependence of Intrinsic Transmission Loss for High Silica Fiber," S. Tanaka et al., European Conference on Optical Communication, 1987, p. 193-196.

(Continued)

*Primary Examiner*—Leonidas Boutsikaris
(74) *Attorney, Agent, or Firm*—McDermott Will & Emery LLP

(57) ABSTRACT

After a wide-band DCF is wound around a bobbin to form an optical fiber coil 32, the latter is removed from the bobbin and placed into a bundle state (the state where the increase in transmission loss in the wavelength band of 1.55 μm caused by distortions in winding is reduced by 0.1 dB/km or more) released from distortions in winding. A resin 42 is used as a coil-tidying member so as to secure the optical fiber coil 32 to a storage case 40 at four positions. Both ends of the optical fiber coil 32 are connected to pigtail fibers at fusion-splicing parts 44, respectively. Even when the storage case 40 is closed with a lid after the optical fiber coil 32 is secured to the storage case 40 with the resin 42, there remain interstices within the bundle of the optical fiber coil 32 and a space between the optical fiber coil 32 and the storage case 40. As a result, even when the optical fiber coil 32 in a bundle state is accommodated in the storage case 40, transmission loss and the like would not increase.

32 Claims, 26 Drawing Sheets

OTHER PUBLICATIONS

"Iwanami Rikagaku Jiten," Fourth Edition, edited by R. Kubo et al., p. 239.

JIS, Japanese Industrial Standard, Lubricating Grease, Japanese Standards Association, Feb. 19, 1993.

\* cited by examiner

U.S. PATENT DOCUMENTS

| | | | |
|---|---|---|---|
| 4,969,710 A | | 11/1990 | Tick et al. |
| 5,175,785 A | | 12/1992 | Dabby |
| 5,179,613 A | * | 1/1993 | Cronk .................. 385/128 |
| 5,250,651 A | * | 10/1993 | Price ..................... 528/59 |
| 5,386,484 A | | 1/1995 | Ooka et al. |
| 5,531,064 A | | 7/1996 | Sawano et al. |
| 5,546,482 A | | 8/1996 | Cordova et al. |
| 5,668,911 A | | 9/1997 | Debortoli |
| 5,742,390 A | | 4/1998 | Cordova et al. |
| 5,835,656 A | | 11/1998 | Oishi et al. |
| 5,920,668 A | | 7/1999 | Uehara et al. |
| 6,004,675 A | | 12/1999 | Akasaka et al. |
| 6,181,859 B1 | | 1/2001 | Suzuki et al. |
| 6,259,845 B1 | | 7/2001 | Sardesai |
| 6,608,954 B1 | * | 8/2003 | Tamano et al. .......... 385/123 |

FOREIGN PATENT DOCUMENTS

| | | |
|---|---|---|
| EP | 0 895 061 A2 | 2/1999 |
| JP | 62-91810 | 4/1987 |
| JP | 62-244005 | 10/1987 |
| JP | 63-162550 | 7/1988 |
| JP | 2-16018 | 2/1990 |
| JP | 02-247520 | 10/1990 |
| JP | 04-195104 | 7/1992 |
| JP | 4-366902 | 12/1992 |
| JP | 05-010771 | 1/1993 |
| JP | 05-313036 | 11/1993 |
| JP | 6-84412 | 10/1994 |
| JP | 07-056042 | 3/1995 |
| JP | 07-183597 | 7/1995 |
| JP | 07-294266 | 11/1995 |
| JP | 8-15531 | 1/1996 |
| JP | 08-050208 | 2/1996 |
| JP | 8-50208 | 2/1996 |
| JP | 8-54546 | 2/1996 |
| JP | 8-75477 | 3/1996 |
| JP | 8-75959 | 3/1996 |
| JP | 8-82726 | 3/1996 |
| JP | 8-86920 | 4/1996 |
| JP | 08-278148 | 10/1996 |
| JP | 8-313767 | 11/1996 |
| JP | 10-31120 | 2/1998 |
| JP | 10-123342 | 5/1998 |

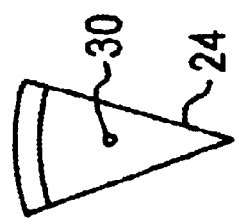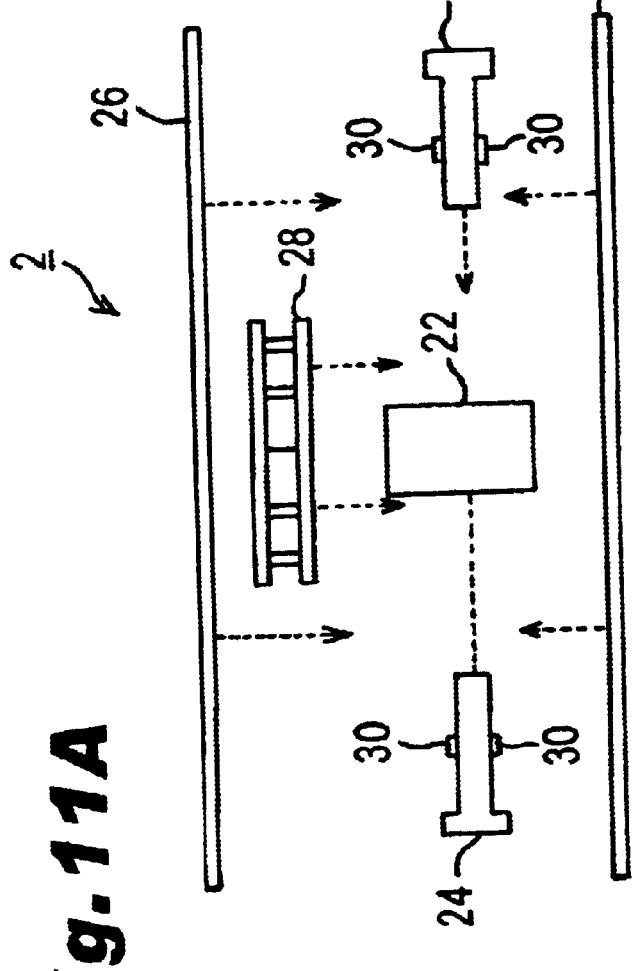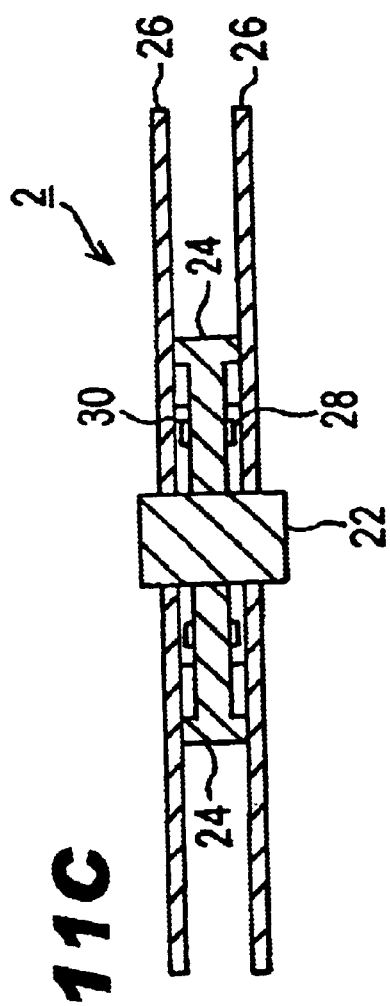

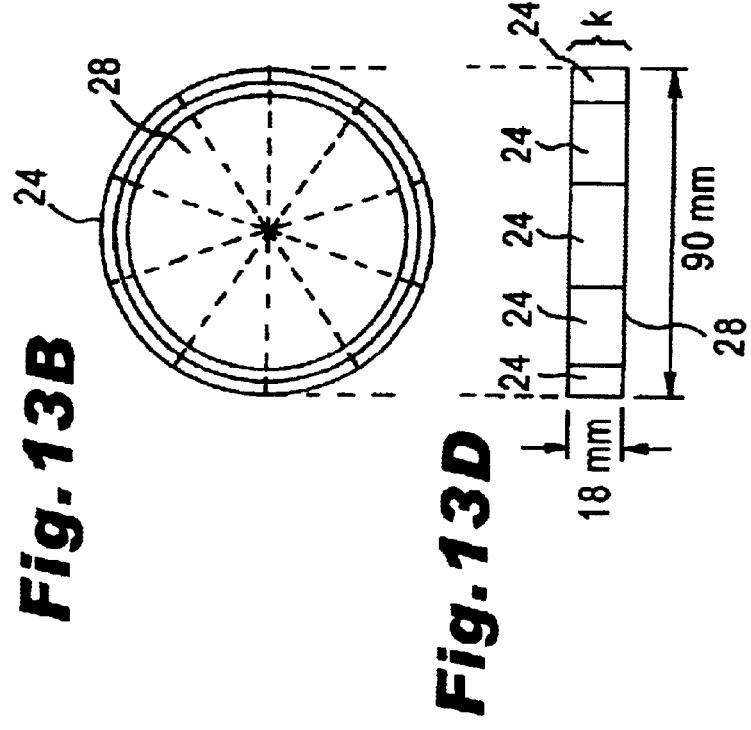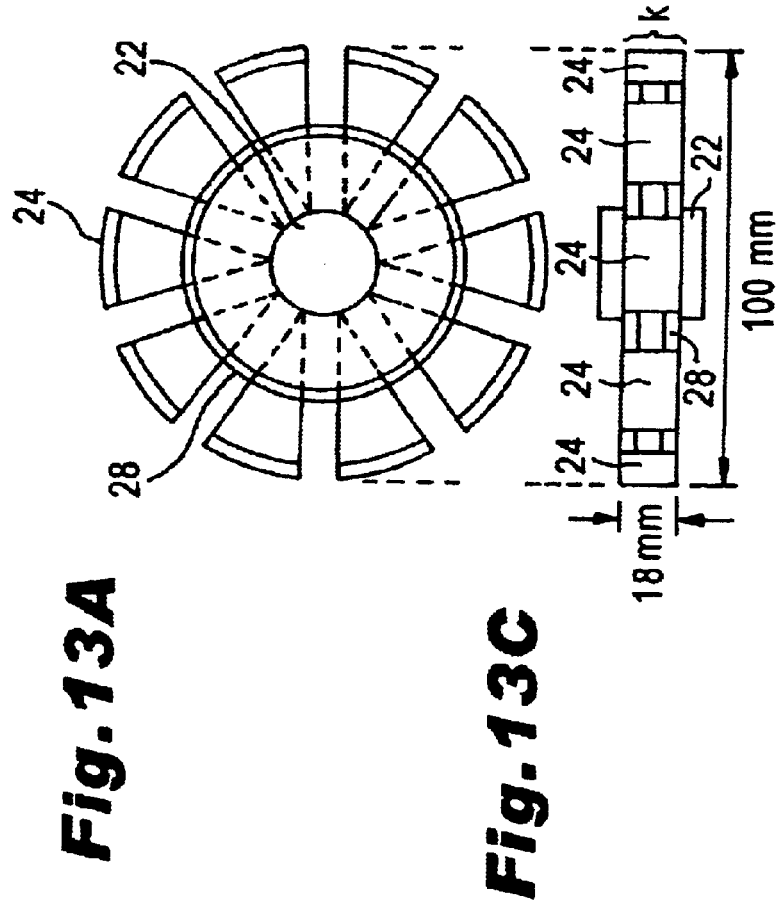

OPTICAL DEVICE AND A MAKING METHOD THEREOF

RELATED APPLICATION

This application is a divisional of application Ser. No. 09/477,561, filed Jan. 4, 2000 now U.S. Pat. No. 6,650,821, which is a continuation-in-part of application Ser. No. 09/240,690, filed Feb. 2, 1999 now U.S. Pat. No. 6,546,180.

BACKGROUND OF THE INVENTION

1. Field of the Invention

The present invention relates to a coiled optical assembly made of a long optical fiber and a fabricating method for the same; and, in particular, to a dispersion compensator for reducing the wavelength dispersion of an optical fiber transmission line in the wavelength band of 1.55 µm, and a fabricating method for the same.

2. Related Background Art

Long-distance, large-capacity transmission is possible in the wavelength band of 1.55 µm by means of an optical amplifier operable in the wavelength band of 1.55 µm utilizing an optical fiber doped with erbium (Er) which is a rare-earth element. However, when transmission is carried out in the wavelength band of 1.55 µm by using a single-mode optical fiber whose zero-dispersion wavelength is in the 1.3-µm band (1.3 SMF), which is employed in conventional optical transmission lines, then a large wavelength dispersion occurs and distorts optical signals, thereby deteriorating the signal quality. As a consequence, when carrying out transmission in the 1.55-µm band with the use of 1.3 SMF, its wavelength dispersion is required to be kept low. Known as one of techniques therefor is a method using a dispersion-compensating optical fiber (DCF) having a large wavelength dispersion with a polarity opposite to that of the dispersion of 1.3 SMF, so as to cancel the wavelength dispersion in the 1.55-µm band.

In a technique employed for carrying out such dispersion compensation with DCF in a conventional long-distance transmission line, a dispersion compensator having a compact size in which a long DCF is wound around a bobbin is installed at every repeater station.

SUMMARY OF THE INVENTION

Nevertheless, since a wide-band DCF has a large bending loss in general, it may yield a large transmission loss in the 1.55-µm band, i.e., transmission wavelength band, when formed into a coil having a small diameter. This bending loss can be reduced when the coil has a larger diameter so that its number of turns is reduced. Increasing the coil diameter, however, is unfavorable in that the dispersion compensator accordingly becomes larger.

Also, the dispersion compensator is often used together with an optical amplifier using an erbium-doped optical fiber. In this case, the temperature of the dispersion compensator increases due to the heat from a pumping laser within the optical amplifier, so that the bobbin may thermally expand. As a result, distortions may occur in the wound wide-band DCF, thereby increasing the transmission loss. Using a material with less thermal expansion in the bobbin can reduce the transmission loss in such a high-temperature environment. However, materials having low coefficients of thermal expansion, such as silica glass, ceramics, special alloys, and the like, are hard to process or expensive.

Therefore, it is an object of the present invention to provide an optical assembly accommodating therein a long optical fiber in a compact fashion, which yields less increase in transmission loss upon such bending or heat; and a method of making the same.

In order to achieve the above-mentioned object, the inventors carried out various studies using the wide-band DCF, results of which will be discussed here.

FIG. 1 is a sectional view of a DCF constituting an optical fiber coil studied. As shown in FIG. 1, the DCF employed has an optical fiber 11 made of glass and two coating layers 13, 15, each made of a resin, formed around the optical fiber 11. FIG. 2 shows the refractive index profile of this DCF. The glass portion 11 is a double-cladding type DCF whose core portion has a diameter a of 2.65 µm, depressed cladding portion has a diameter b of 7.58 µm, and outside diameter c is 100 µm. The primary coating layer 13 has a thickness d of 20 µm. The secondary coating layer 15 has a thickness e of 20 µm. The outside diameter f of the fiber is 180 µm. The relative refractive index differences Δ+, Δ− of the core portion and depressed cladding portion with respect to the refractive index of the outer cladding portion were set to 2.1% and −0.4%, respectively. At 20° C., the Young's modulus of the primary coating layer 13 was 0.06 kgf/mm$^2$, and that of the secondary coating layer 15 was 65 kgf/mm$^2$. The wavelength dispersion and wavelength dispersion slope of this DCF were −100 ps/nm/km and −0.29 ps/nm$^2$/km at the wavelength of 1.55 µm, respectively, whereas its transmission loss was 0.40 dB/km.

FIG. 3 is a perspective view of a take-up bobbin 2 used for producing the optical fiber coil. Around the bobbin 2 made of aluminum having a body portion 20 with a diameter g of 100 mm, flanges 21 with a diameter of 200 mm, and a winding width k of 18 mm, the above-mentioned DCF having a fiber length of 10 km was wound at a winding pitch of 0.4 mm with a take-up tension of 40 gf, so as to produce the optical fiber coil.

The respective transmission characteristics of thus obtained optical fiber coil (type 1) wound around the bobbin, the optical fiber coil (type 2) loosened into a bundle form after being removed from the bobbin, and the optical fiber coil (type 3) obtained after that of type 1 had been subjected to a predetermined heat treatment were measured and compared with each other.

FIG. 4 shows the heat cycle of the heat treatment applied to the optical fiber coil of type 3. In this heat treatment, the optical fiber coil of type 1 was left for 1 hour at a temperature of 20° C., subsequently the temperature was raised at a rate of 1° C./minute until it reached 80° C., at which the optical fiber coil was left for 1 hour, and then the temperature was lowered at a rate of 1° C./minute until it reached −40° C., at which the optical fiber coil was left for 1 hour. After this cycle was repeated once again, the optical fiber coil was finally maintained at 20° C. and left for 2 hours.

FIG. 5 is a graph comparing, at each wavelength, the transmission loss values of the optical fiber coils of types 1 and 2 with those of the optical fiber before being wound up. In the optical fiber coil of type 1, a large transmission loss (1.7 dB at 1.55 µm) occurred in the 1.55-µm band, i.e., transmission wavelength band, and the transmission loss became greater as the wavelength was longer. It is due to the microbend loss occurring when the optical fiber is bent with a small curvature. By contrast, this microbend loss substantially disappeared from the optical fiber coil of type 2. From these facts, the inventors have found that the transmission loss generated upon the winding of a coil is mainly caused by distortions in winding due to a multiplex winding, e.g., lateral pressures applied to each fiber from its adjacent fibers, which cause the optical fiber to bend, thereby generating a microbend loss upon coil winding. Hence, the inventors have concluded that an optical fiber coil having a low transmission loss can be produced if these lateral pressures are eliminated.

When the optical fiber coil of type 2 was heated to 70° C. and then its transmission loss was measured at a wavelength of 1.55 µm, the measured value was greater than that at 20° C. by 0.06 dB. This small amount of change in transmission loss value is comparable with the value of 1.3 SMF reported in a literature (Tanaka et al., "TEMPERATURE DEPENDENCE OF INTRINSIC TRANSMISSION LOSS FOR HIGH SILICA FIBER", European Conference on Optical Communication, pp. 193–196, 1987). Therefore, this transmission loss is considered to be the temperature-dependent loss inherent in the optical fiber, which is a value irrelevant to the lateral pressures.

FIG. 6 is a graph comparing, at each wavelength, the transmission loss values of the optical fiber coils of types 1 and 3 with those of the optical fiber before being wound up. In the optical fiber coil of type 3, the amount of change in loss was reduced to that of the optical fiber coil of type 1, whereby its amount of change in transmission loss at a wavelength of 1.55 µm was 0.25 dB, though the amount of change in transmission loss of this optical fiber coil at a wavelength of 1.55 µm further increased by 0.24 dB when heated to 70° C., it was still lower than that of the optical fiber coil of type 1 at 20° C., i.e., 1.7 dB.

Thus, the inventors have found that subjecting a coil to a heat treatment can reduce its lateral pressures and also lower the temperature dependence of its amount of change in transmission loss.

Therefore, the present invention is configured as follows.

The coiled optical assembly made of a long optical fiber in accordance with the present invention comprises an optical fiber coil in which the long optical fiber is formed into a coil and adjusted into a state where the amount of increase in transmission loss in a predetermined wavelength band upon coiling is reduced by 0.1 dB/km or more, and a storage case accommodating the optical fiber coil.

Since the optical fiber coil is accommodated in the storage case in a state where the amount of increase in transmission loss in a predetermined wavelength band upon coiling is reduced by 0.1 dB/km or more so as to substantially release distortions in winding, the lateral pressure applied by each layer of the optical fiber to another layer of the optical fiber due to multiplex winding of the long optical fiber is alleviated. Also, when wound around a bobbin, the optical fiber is less likely to be influenced by the thermal expansion of the bobbin even in a high-temperature environment.

When the long optical fiber has a wavelength dispersion and a wavelength dispersion slope which have polarities opposite to those of the wavelength dispersion and wavelength dispersion slope of the optical fiber constituting a transmission line, respectively, then the coiled optical assembly functions as a dispersion compensator for reducing the wavelength dispersion in a predetermined wavelength band. As a consequence, a dispersion compensator having a favorable characteristic can be obtained.

The storage case may accommodate the long optical fiber in a bundle form. When the coil-shaped optical fiber is loosened into a bundle form and accommodated in the storage case, then its distortions in winding can substantially be released in a simple manner.

Alternatively, the optical fiber coil may be wound around a bobbin. In this case, the lateral pressures applied to the optical fiber from its adjacent layers of optical fiber or the bobbin are alleviated, and the optical fiber coil is accommodated so as to be free from the influence of the thermal expansion of the bobbin even when placed in a high-temperature environment.

The bobbin may be made of a metal. In this case, by forming the optical fiber coil in a state where the bobbin is heated and expanded, and then cooling and shrinking the bobbin, the optical fiber coil can be adjusted into a state where distortions in winding are substantially released.

When the winding pitch of the optical fiber coil is set to a value at least twice as large as the diameter of the long optical fiber, then mode coupling occurs between orthogonal polarization modes, whereby polarization mode dispersion (PMD) can be reduced.

The diameter of the optical fiber coil may be 100 mm or less in its smallest portion. In such a state which is substantially free of distortions in winding, it is possible to produce an optical assembly using a small-sized optical fiber coil having a diameter of 100 mm or less, which has conventionally been difficult.

Preferably, the long optical fiber has a coating layer on the outer peripheral surface thereof. Preferably, this coating layer is the one in which a primary coating layer made of a coating material having a Young's modulus of at least 0.03 kgf/mm$^2$ but not greater than 0.15 kgf/mm$^2$ and a secondary coating layer made of a coating material having a Young's modulus of at least 50 kgf/mm$^2$ but not greater than 100 kgf/mm$^2$ are laminated, or a coating layer made of a coating material having a Young's modulus of at 1 kgf/mm$^2$ but not greater than 120 kgf/mm$^2$. Preferably, the coating layer has a thickness of at least 20 µm but not greater than 70 µm.

When such a coating layer is provided, then it becomes easier to coil the long optical fiber in a state substantially released from distortions in winding.

The optical assembly of the present invention may further comprise a coil-tidying member which secures the optical fiber coil to the storage case or bobbin, thereby preventing the optical fiber coil from becoming disordered in winding.

When the coil-tidying member secures the optical fiber coil to the storage case or bobbin, then, even when the optical fiber coil is accommodated in the state substantially released from distortions in winding, it is possible to prevent the optical assembly from vibrating upon transportation or the like, the optical fiber from breaking upon impacts, the wound optical fiber coil from becoming disordered, and the transmission loss from thereby increasing.

The coil-tidying member may be formed by a resin which secures the optical fiber coil to the storage case or bobbin at a plurality of positions. Alternatively, it may be a cushion material securing the optical fiber coil to the storage case. The coil-tidying member may further comprise a filler for securing and holding the optical fiber coil. As the filler, a thermosetting or UV-curable silicon gel having a Young's modulus of 0.05 kg/mm$^2$ or less upon curing or a jelly-like admixture having a high viscosity is preferable.

When the optical fiber coil is thus secured to the storage case or bobbin by means of the coil-tidying member, it is possible to easily prevent the optical assembly from vibrating upon transportation or the like, the optical fiber from breaking upon impacts, the wound optical fiber coil from becoming disordered, and the transmission loss from thereby increasing.

Also, a cushioning filler may fill gaps between turns of the optical fiber constituting the optical fiber coil. As this filler, a thermosetting or UV-curable silicon gel having a Young's modulus of 0.05 kg/mm² or less upon curing or a jelly-like admixture having a high viscosity is preferable.

When the cushioning filler fills gaps between turns of the optical fiber, then the lateral pressures generated by the turns of the optical fiber acting on each other are alleviated, whereby distortions in bending are suppressed. Further, this filler can easily prevent the optical assembly from vibrating upon transportation or the like, the optical fiber from breaking upon impacts, the wound optical fiber coil from becoming disordered, and the transmission loss from thereby increasing.

On the other hand, the fabricating method for a coiled optical assembly made of a long optical fiber in accordance with the present invention comprises a coil making step of winding the long optical fiber around a bobbin so as to make an optical fiber coil; and an adjustment step of adjusting the optical fiber into a state where the amount of increase in transmission loss in a predetermined wavelength band upon this coil making step is reduced by 0.1 dB/km or more.

Thus, as the optical fiber is placed into a state where the amount of increase in transmission loss in a predetermined wavelength band upon this coil making step is reduced by 0.1 dB/km or more in the adjustment step so as to substantially release distortions in winding, the coiled optical assembly in accordance with the present invention can be produced.

For example, this adjustment step can employ any of: (1) a step of holding, after the coil making step, the optical fiber coil at at least one of temperatures which are lower and higher than the temperature in the coil making step, respectively; (2) a step of vibrating the bobbin wound with the optical fiber coil after the coil making step; and (3) a step of removing the optical fiber coil from the bobbin and loosening thus removed optical fiber coil into a bundle form.

In the step (1), which is derived from the above-mentioned finding, the coil is subjected to a heat treatment, so as to reduce lateral pressures, whereby the coil is adjusted into the state where distortions in winding are substantially released. In the step (2), the bobbin is vibrated so as to homogenize the winding state of the coil, thereby making the lateral pressures uniform and adjusting the optical fiber coil into the state substantially released from distortions in winding. In the step (3), the coil is loosened into a bundle form, so as to be adjusted in the state substantially released from distortions in winding.

The method may further comprise a filling step of accommodating the optical fiber coil in a storage case and filling the storage case with a cushioning filler. When the storage case is thus filled with the cushioning filler, the optical fiber coil can be secured and held without excess lateral pressures being applied thereto.

The method may further comprise a lubricant coating step of coating the bobbin with a lubricant prior to at least one of the coil making step and adjustment step. This is effective in that the friction between the bobbin and the optical fiber coil can be reduced, whereby it is possible to reduce lateral pressures and enhance the elimination of distortions in winding upon the adjustment step.

In another aspect, the fabricating method for a coiled optical assembly in accordance with the present invention comprises a coil making step of forming an optical fiber coil by winding a long optical fiber around a bobbin in a state where the amount of increase in transmission loss in a predetermined wavelength band upon coiling is reduced by 0.1 dB/km or more. Preferably, this coil making step comprises at least one of (1) a step of winding the long optical fiber around the bobbin in a state where at least one of the long optical fiber and the bobbin is maintained at a predetermined temperature not lower than 60° C.; and (2) a step of winding the long optical fiber around the bobbin at a take-up tension of 50 gf or less.

The step (1) can alleviate lateral pressures which may occur after the bobbin or optical fiber is cooled. The step (2) can form a coil in a state substantially released from distortions in winding.

In still another aspect, the fabricating method for a coiled optical assembly comprises a coil making step of winding a long optical fiber around a bobbin so as to make an optical fiber coil; and a body diameter changing step of substantially reducing, after the coil making step, the diameter of the bobbin from the diameter thereof in the coil making step, so that the optical fiber is adjusted into a state where the amount of increase in transmission loss in a predetermined wavelength band upon winding is reduced by 0.1 dB/km or more.

When the body diameter is thus substantially reduced in the body diameter changing step, so as to form an optical fiber coil in a bundle form in which a wide-band DCF is loosened, then the lateral pressures generated due to a multilayer of winding are alleviated, whereby the optical fiber coil that is not influenced by thermal expansion of the bobbin even when placed in a high-temperature environment can reliably be made.

Further, the method of making an optical assembly in accordance with the present invention may comprise a filler coating step of coating an outer periphery of a long optical fiber with a cushioning filler, and a coil making step of winding the long optical fiber, whose outer periphery is coated with the filler, around a bobbin, so as to make an optical fiber coil; or a coil making step of making an optical fiber coil while coating, simultaneously with winding the long optical fiber around a bobbin, the surface of the bobbin for winding the long optical fiber and the outer periphery of the wound long optical fiber with a cushioning filler.

In this manner, since the cushioning filler is disposed between turns of the optical fiber and between the optical fiber and the bobbin, the lateral pressures applied to the optical fiber are alleviated, whereby the optical fiber coil that is not influenced by thermal expansion of the bobbin even when placed in a high-temperature environment can securely be made.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is a sectional view of a DCF constituting an optical fiber coil used for a study prior to the present invention, whereas

FIG. 7 is a schematic view showing a dispersion compensator in accordance with a first embodiment of the present invention, whereas

FIG. 9 is a side view showing a dispersion compensator in accordance with a second embodiment of the present invention, whereas

FIG. 11A is an exploded view of a bobbin in the second embodiment,

FIG. 11B is a side view of a wedge member thereof,

FIG. 11C is a sectional view of the bobbin taken along a plane including the center axis of the bobbin.

FIGS. 13A to 13D are views for explaining a mechanism for reducing the body diameter of the bobbin after a DCF is wound therearound;

FIG. 14 is an exploded perspective view of a dispersion compensator in accordance with a third embodiment of the present invention, whereas

FIG. 17 is a perspective view showing a dispersion compensator in accordance with a fourth embodiment of the present invention, whereas

FIG. 19 is a sectional view showing a dispersion compensator in accordance with a fifth embodiment of the present invention, whereas

FIG. 21 is an enlarged sectional view showing a dispersion compensator in accordance with a sixth embodiment of the present invention, whereas

FIG. 29 is a chart showing how temperature changes in a heat cycle applied to a wound coil, whereas

FIGS. 34 and 35 are configurational views of optical transmission systems each using a dispersion compensator in accordance with the present invention, whereas

DETAILED DESCRIPTION OF THE PREFERRED EMBODIMENTS

Figure 1:
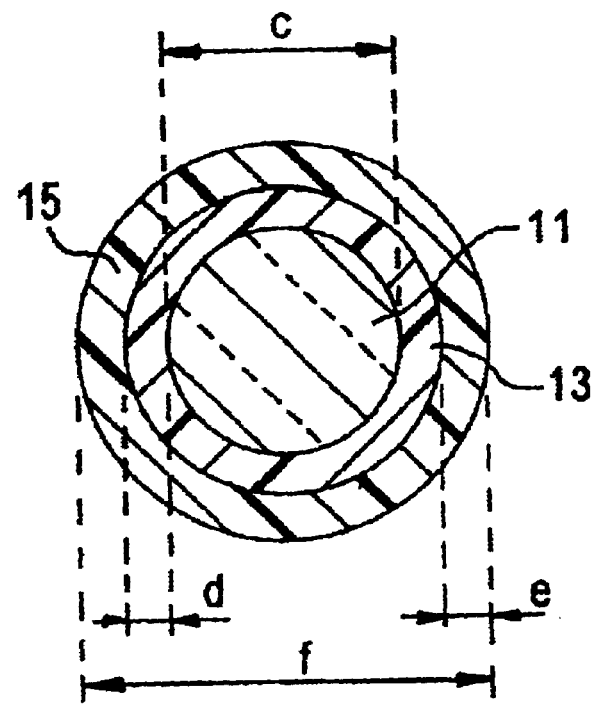

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. Though the following explanations mainly relate to embodiments of dispersion compensators in which optical fiber coils are made of a wide-band DCF (hereinafter simply referred to as DCF), the present invention is also applicable to optical assemblies which form optical fiber coils by using other long optical fibers.

First Embodiment

Figure 7:
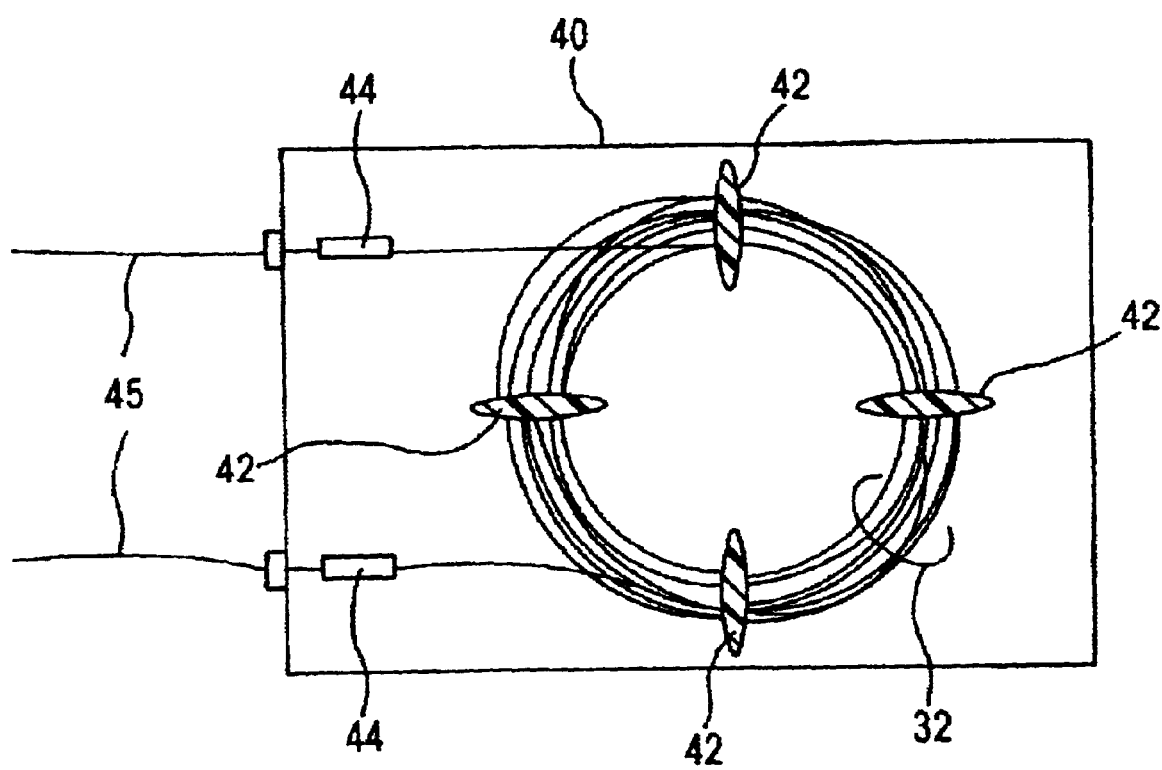

To begin with, a dispersion compensator in accordance with a first embodiment will be explained. FIG. 7, which illustrates the dispersion compensator in accordance with the first embodiment, is a sectional view showing an optical fiber coil 32 accommodated in a storage case 40.

As shown in FIG. 7, the optical fiber coil 32 bundled in a state substantially released from distortions in winding is accommodated in the storage case 40 and secured thereto at four positions with the aid of resin pieces 42. Both ends of the optical fiber coil 32 are connected to pigtail fibers 45 at fusion-splicing parts 44, respectively.

Figure 5:
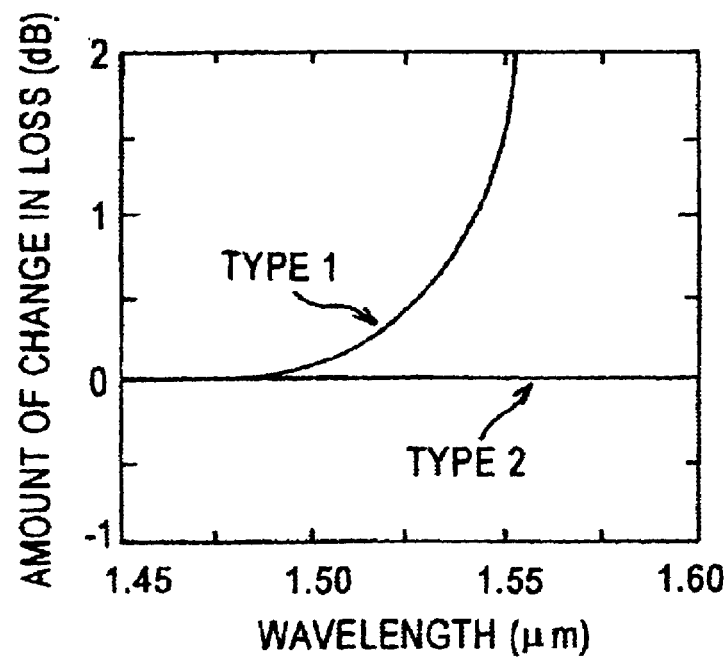
FIGS. 5 and 6 are graphs comparing amounts of change in transmission loss of optical fiber coils produced in comparative experiments.
Figure 6:
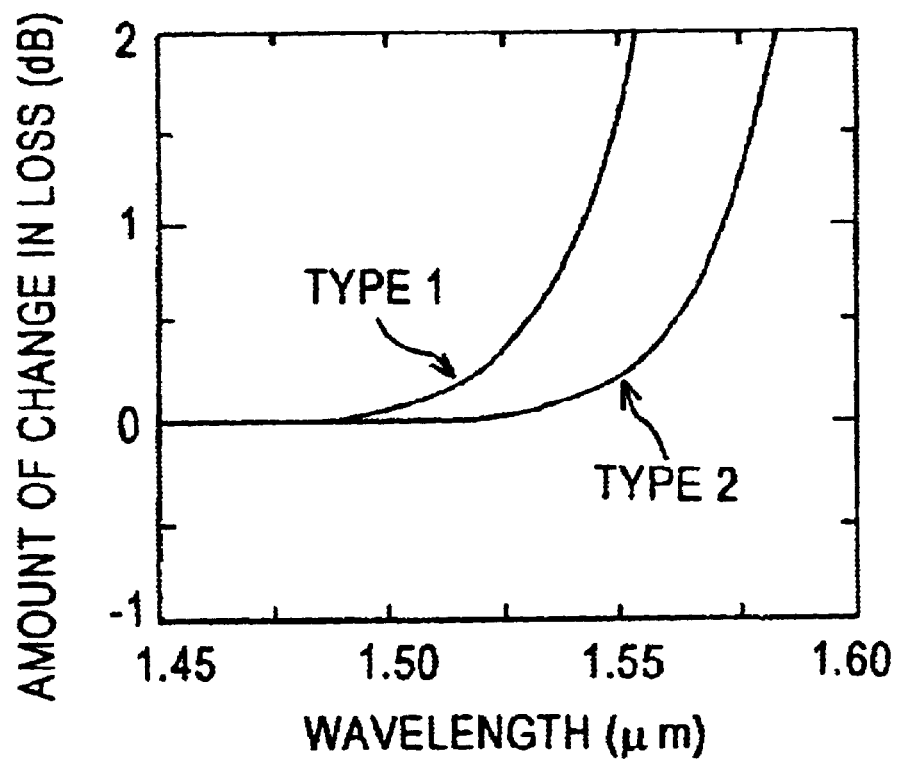

Here, the state substantially released from distortions in winding refers to a state where the increase in transmission loss in the wavelength band of 1.55 μm caused by the distortions in winding is suppressed to 0.1 dB/km or less. It is due to the fact that the increase in transmission loss of the optical fiber coil 32 in a loosened state removed from the bobbin is substantially eliminated as shown in FIG. 5 and, as the distortions in winding are eliminated, their resulting transmission loss also disappears.

In order to restrain the transmission loss value of the optical fiber coil from increasing and suppress its temperature dependence, the resin preferably has a low coefficient of thermal expansion and a low coefficient of contraction after its coating, while exhibiting a sufficient adhesive property. An example of such a resin is KE45T, which is a silicone resin manufactured by Shin-Etsu Chemical Co., Ltd. Preferably, at least four securing parts are formed by the resin at substantially identical intervals around the periphery of the coil. It is due to the fact that the optical fiber coil can be secured sufficiently and reliably to the storage case if there are at least four securing parts. More preferably, at least eight securing parts are formed at substantially identical intervals, since they can endure considerable impacts. Preferably, each resin securing part has a width of about 5 mm. It is due to the fact that no undue pressure will be applied to the optical fiber when a resin is applied thereto in such a width by means of an applicator.

Figure 3:
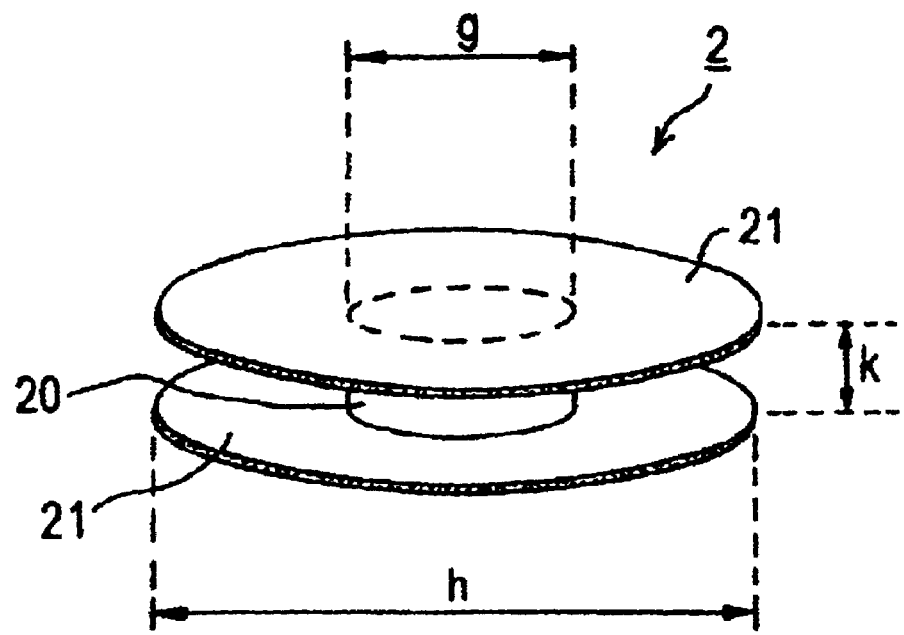
FIG. 3 is a perspective view of a take-up bobbin used for making the optical fiber coil.
Figure 4:
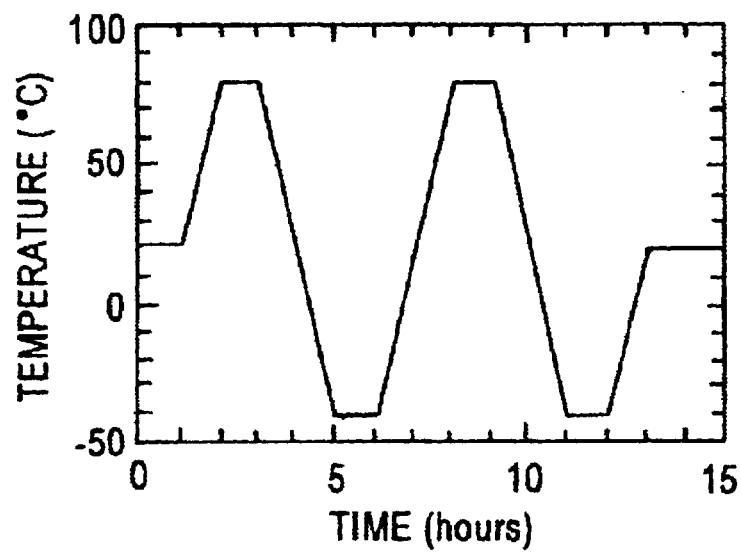
FIG. 4 is a chart showing the heat cycle of a heat treatment applied to an optical fiber coil produced in a comparative experiment.

Preferably, the body portion of the bobbin (see FIG. 3) is coated with a lubricant, such as finely divided powder, before the DCF is wound therearound. It is due to the fact that, when the bobbin is coated with the lubricant, the coefficient of friction between the optical fiber coil and the bobbin surface can be reduced, whereby it becomes easier to pull out the optical fiber coil. For example, in the case of an optical fiber coil manufactured under the condition of the above-mentioned type 1 with no coating applied to the bobbin, it took about 15 minutes for the optical fiber coil to be pulled out from the bobbin. In the case of an optical fiber coil manufactured after the bobbin was coated with talc (see Iwanami Rikagaku Jiten, the fourth edition, p. 239) which was used as a powder inorganic filler, by contrast, it took about 4 minutes for the optical fiber coil to be pulled out from the bobbin. Without being restricted to finely divided powders such as talc, any lubricant may be used as long as it can lower the coefficient of friction between the DCF and the bobbin surface when pulling out the optical fiber coil from the bobbin. For example, it may be a liquid, and it may be applied after coiling as well.

The tension used when taking up the DCF around the bobbin is preferably as small as possible. It is due to the fact that, when the tension is small, then the friction between the optical fiber coil and the bobbin surface can be lowered, whereby it becomes easier to pull out the optical fiber coil. For example, in the case where an optical fiber coil was manufactured by winding a DCF around a talc-coated bobbin with a take-up tension of 50 gf, it took about 20 minutes for the coil to be pulled out. When an optical fiber coil was manufactured in the same manner except that the take-up tension was changed to 40 gf, by contrast, it took about 4 minutes for the coil to be pulled out. The take-up tension is preferably as low as possible unless the winding state of the DCF becomes disordered. The inventors manufactured various kinds of optical fiber coils with different tensions and, as a result, have found it preferable to set the tension to 40 gf or less in this embodiment.

The optical fiber coil in a bundle form is not limited to the one produced by a method comprising the steps of winding a DCF around a bobbin and then removing it from the bobbin. During the step of making the optical fiber coil, the DCF may be wound around a member equivalent to a bobbin so as to produce the optical fiber coil, which is then removed from this member.

Figure 8:
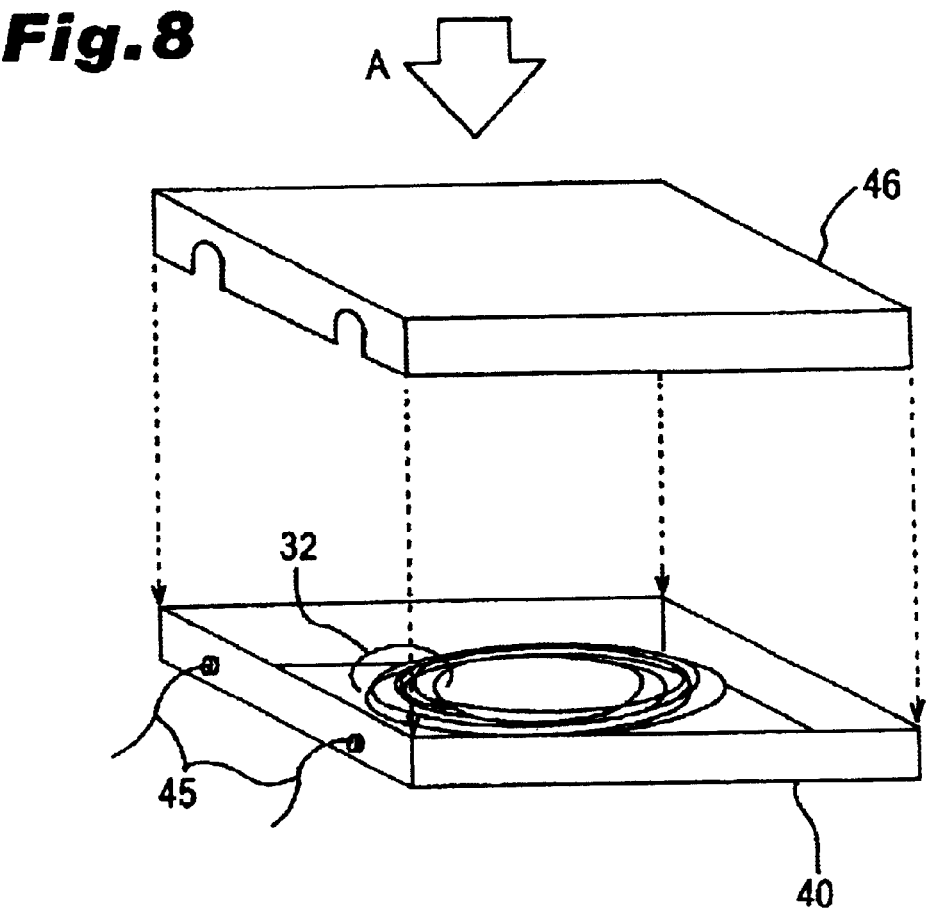
FIG. 8 is a schematic view showing a moment at which an optical fiber coil is accommodated in a storage case in this dispersion compensator.

FIG. 8 is a schematic view showing a moment at which the optical fiber coil 32 is accommodated in the storage case 40. After the optical fiber coil 32 is secured to the storage case 40 with the aid of the resin (not illustrated), the storage case 40 is closed with a lid 46, whereby the fiber coil 32 is accommodated in the storage case 40 in a state where winding is prevented from becoming disordered. Even in the state closed with the lid 46, interstices exist between the individual turns of the fiber constituting the DCF bundle of the optical fiber coil 32 and between the DCF bundle and the storage case 40, whereby the DCF is kept from being influenced by thermal expansion of its surroundings even when placed in a high-temperature environment.

Thus accommodated optical fiber coil was subjected to an impact test. The impact test was carried out in compliance with the requirements of IEC68-2-29Eb under the condition with an acceleration of 98 m/sec$^2$, an impact application time of 16 msec, and an impact application number of 1000. As indicated by the arrow A in FIG. 8, the direction of impact application was perpendicular to the plane including the wound optical fiber coil. Even after this impact test, no disorder in winding occurred in the optical fiber coil. No increase in transmission loss was found when the transmission loss value was measured at a wavelength of 1.55 µm, and no increase in loss other than that inherent in the optical fiber was found when measured after the temperature was raised to 70° C.

Thus, as the optical fiber coil 32 in a bundle state is secured to the storage case 40, it can be accommodated in the storage case in the state where distortions in winding of the optical fiber coil are substantially released without generating disorders in winding. As a consequence, the optical fiber coil is prevented from being broken or changing its characteristics due to vibrations, impacts, and the like, and it is possible to obtain a small-sized dispersion compensator whose transmission loss value and temperature dependence of transmission loss are reduced.

Second Embodiment

Figure 9:
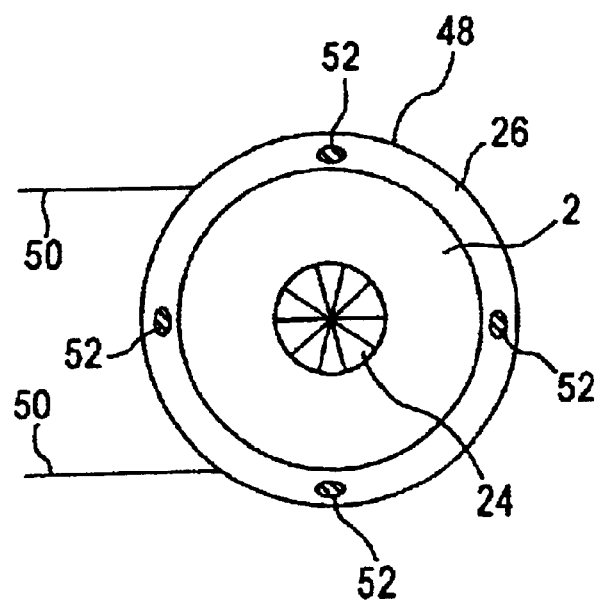

The dispersion compensator in accordance with a second embodiment will now be explained. FIG. 9 is a side view showing the dispersion compensator in accordance with the second embodiment. In this embodiment, an optical fiber coil 48 is secured to a bobbin 2 in a state wound around the bobbin 2. Namely, with the aid of a resin applied to four resin application portions 52 located at a flange 26 of the bobbin 2, the optical fiber coil 48 is secured to the flange 26, i.e., bobbin 2, whereas the DCF 50 is drawn out from both ends of the optical fiber coil 48. Though the portions coated with the resin are actually hidden inside the flange 26, they are illustrated explicitly for the sake of explanation.

Figure 10:
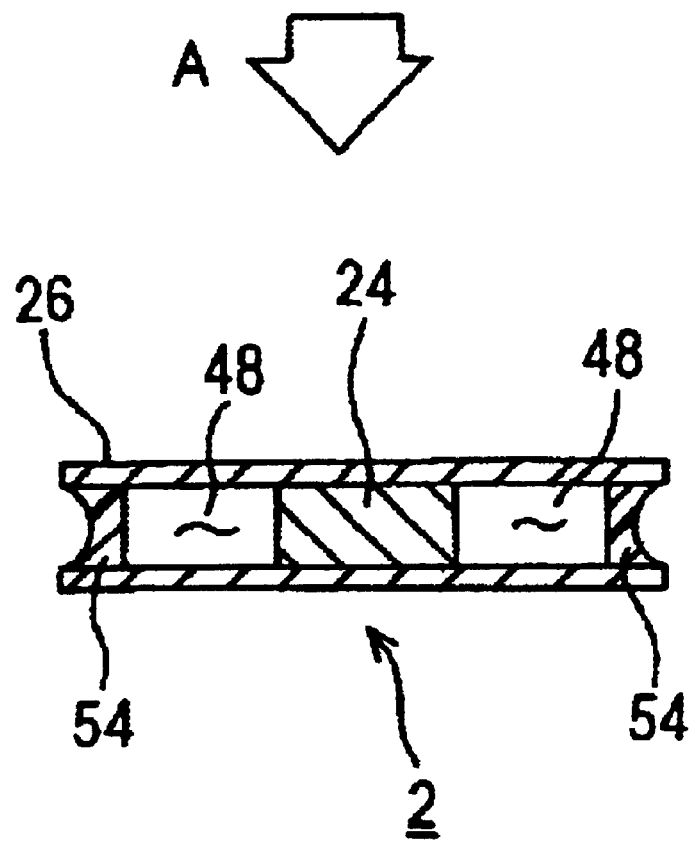
FIG. 10 is a vertical sectional view thereof.

FIG. 10 is a vertical sectional view of this dispersion compensator. A resin 54 is applied so as to secure the optical fiber coil 48 to two sheets of flanges 26 on the inside thereof. As the resin 54, the one identical to that of the first embodiment can be used. Thus, the optical fiber coil 48 is secured at a plurality of positions from therearound. Preferably, at least four securing parts are formed by the resin at substantially identical intervals. It is due to the fact that the optical fiber coil 48 can be secured sufficiently to the flange 26, i.e., bobbin 2, if there are at least four securing parts. More preferably, at least eight securing parts are formed at substantially identical intervals, since they can endure considerable impacts. Preferably, the resin 54 has a width of about 5 mm. It is due to the fact that no undue pressure will be applied to the fiber constituting the coil when a resin is applied thereto in such a width by means of an applicator.

Figure 12A:
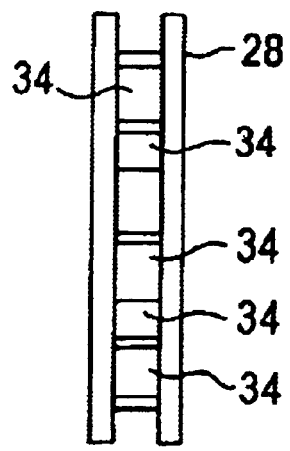
FIG. 12A is a top plan view of a support member of the bobbin.

The configuration of the bobbin 2 will now be explained with reference to FIGS. 11A to 11C and 12A to 12C. FIG. 11A is an exploded view of the bobbin 2, FIG. 11B is a side view of a wedge member 24 thereof, and FIG. 11C is a sectional view of the bobbin 2 taken along a plane including the center axis thereof. FIG. 12A is a top plan view of a support member 28, FIG. 12B is a lateral sectional view of the support member 28, and FIG. 12C is an enlarged view of a groove 36.

As shown in FIG. 11A, the bobbin 2 comprises a cylindrical core member 22, two flanges 26, a support member 28, and a plurality (10 pieces in FIG. 9) of wedge members 24. Each flange 26 is a thin disc having an opening at the center part, into which the core member 22 is inserted. The support member 28 has an opening at the center part, into which the core member 22 is inserted. As shown in FIG. 11B, each wedge member 24 has a sector form which is obtained when a disc is divided into 10 equal parts by lines intersecting at the center thereof. The center part of the wedge member 24 is provided with a protrusion 30 on each side, whereas the circumferential part has a thick portion having a dimension identical to the winding width of the coil.

When these members are assembled together, then, as shown in FIG. 11C, the two flanges 26 hold the support member 28 from both sides, and these members are arranged concentrically. When the core member 22 is inserted into the opening located at the center part of thus arranged members, the flanges 26 and the support member 28 are secured to each other thereby. The wedge members 24 are held between the support member 28 and the flanges 26 on both sides thereof so as to be secured, while coming into contact with the core member 22 at their tips.

Figure 12B:
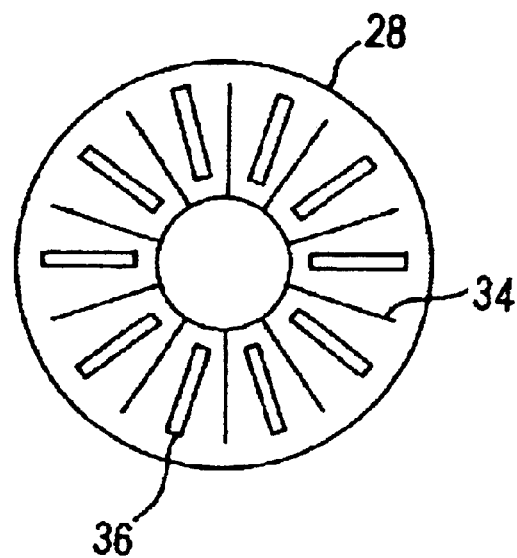
FIG. 12B is a transverse sectional view of the support member.
Figure 12C:
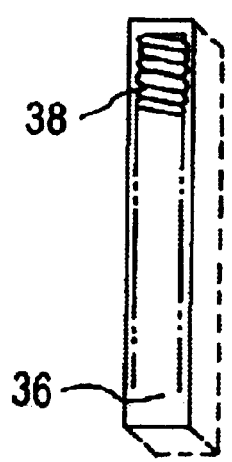
FIG. 12C is an enlarged view of a groove portion of the support member.

As shown in FIGS. 12A and 12B, the support member has a structure in which two discs are bonded to each other with connection walls 34 each extending from the circumferential side to the edge of the opening. In order to insert the wedge members 24 therebetween, 10 pieces of the connection walls 34 are disposed in conformity to the form of the wedge part. The center part between each pair of the neighboring connection walls 34 is formed with a groove 36 extending from the peripheral side toward the center. As shown in FIG. 12C, the groove 36 is made of a rectangular parallelepiped depression. Disposed within the groove 36 is a helical spring 38 whose one end is secured to the peripheral side of the support member 28. The helical spring is employed here since it has a simple structure and can be made with a small size. In place of the helical spring, a variety of elastic bodies can be employed as well.

With reference to FIGS. 13A to 13D, a mechanism for reducing the body diameter of the bobbin 2 after taking up a DCF will now be explained. In FIGS. 13A to 13D, in order for the compressing mechanism to be easily discernible, the flanges 26 are omitted, and the wedge members 24 hidden inside the support member 28 are indicated by broken lines.

FIGS. 13A and 13C are a side view and a top plan view each showing the bobbin before its body diameter is reduced. The wedge members 24 are inserted between the connection walls 34 of the support member 28 with their wedge parts directed to the center and come into contact with the core member 22 at their tips. The protrusions 30 on both sides fit into their corresponding grooves 36 while compressing the respective helical springs 38. As a consequence, each wedge member 24 receives the force directed toward the center from its corresponding helical spring 38, so as to be secured by the core member 22 having a diameter of 10 mm. Hence, the arcs of 10 wedge members 24 form substantially a cylindrical body portion of the bobbin. Thus formed cylindrical surface is used for winding the DCF (not illustrated). Here, the body diameter g is 100 mm, and the winding width k is 18 mm.

FIGS. 13B and 13D are a side view and a top plan view each showing the bobbin after its body diameter is reduced. When the core member 22 is pulled out from the bobbin 2, then the wedge members 24 move toward the center due to the forces of the helical springs 38 so that their wedge parts are put together, whereby a compressed cylindrical body portion of the bobbin is formed. After this compression, the body diameter g is 90 mm.

The compressible bobbin structure is not limited to that explained above. Any specific mechanism can be used as long as the body diameter in the state accommodated in the dispersion compensator is substantially reduced as compared with that at the time when the DCF is being wound therearound. The number of the wedge members 24, the structure of the groove 36, and so forth are given by way of illustration only, and other configurations may be employed as long as their functions can be exhibited. Here, "substantially reduced" refers to such a compression that distortions in winding are released, whereby the transmission loss and the temperature dependence of transmission loss can be reduced.

As can be seen from the foregoing explanations, the degree of reduction in body diameter can be modified by the diameter of the core member 22. Preferably, the ratio of reduction is a few % with respect to the body diameter. Such a degree of reduction can substantially release distortions in winding, whereby lateral pressures can be alleviated. For fully alleviating the lateral pressures, it is more preferable that the ratio of reduction be 5% to 6%. Here, it is unnecessary for the degree of reduction to exceed 10% at most.

The DCF having the characteristics mentioned above and a length of 10 km was wound around the above-mentioned compressible bobbin under the condition with a winding pitch of 0.4 mm and a take-up tension of 40 gf, so as to produce an optical fiber coil. The transmission loss value before reducing the body diameter of the bobbin was measured and found to be 1.7 dB at a wavelength of 1.55 µm. Subsequently, after the body diameter was reduced to 90 mm, the optical fiber coil was loosened without changing its outside diameter of winding and was swung so as to homogenize the winding state of the whole optical fiber or its state of irregularity, and then the transmission loss value was measured, whereby it was found that the increase in transmission loss value generated upon coiling disappeared. When the transmission loss value of this coil was measured after the coil was heated to 70° C., the increase in loss compared with that at 20° C. was 0.06 dB, indicating that no increase in loss occurred other than that inherent in the optical fiber.

When the bobbin is thus compressed after a plurality of turns of DCF are wound therearound to produce an optical fiber coil, then the optical fiber coil is placed in a state substantially released from distortions in winding. As a consequence, the lateral pressures generated due to a multilayer of winding of the DCF are alleviated, and the optical fiber coil is kept from being influenced by thermal expansions of the bobbin even when placed in a high-temperature environment, whereby the transmission loss of the optical fiber coil and its temperature dependence of the transmission loss can be reduced. Namely, the optical fiber coil can be accommodated in the bobbin in a state where the wavelength-dispersion-compensating optical fiber is substantially released from distortions in winding.

Then, the optical fiber coil in a state where the coil was secured to the bobbin at several positions as shown in FIGS. 9 and 10 was subjected to an impact test under the same condition as that of the first embodiment. As indicated by the arrow A in FIG. 10, the direction of impact application was perpendicular to the plane including the optical fiber coil 48. Even after this impact test, no disorder in winding occurred in the optical fiber coil. Also, no increase in transmission loss was found when the transmission loss value was measured at a wavelength of 1.55 µm, and no increase in loss other than that inherent in the optical fiber was found when measured after the temperature was raised to 70° C.

As explained in the foregoing, when the body diameter of the bobbin is reduced after the DCF is wound therearound, and the optical fiber coil 48 is secured to the flanges 26 of the bobbin 2 with the resin 52, then the bobbin 22, which also acts as a storage case, can accommodate the optical fiber coil 48 in a state where the optical fiber coil is substantially released from distortions in winding loss without causing the winding to become disordered. As a consequence, the optical fiber coil is prevented from being broken or changing its characteristics due to vibrations, impacts, and the like, and it is possible to obtain a small-sized dispersion compensator whose transmission loss value and temperature dependence of transmission loss are reduced.

Third Embodiment

Figure 14:
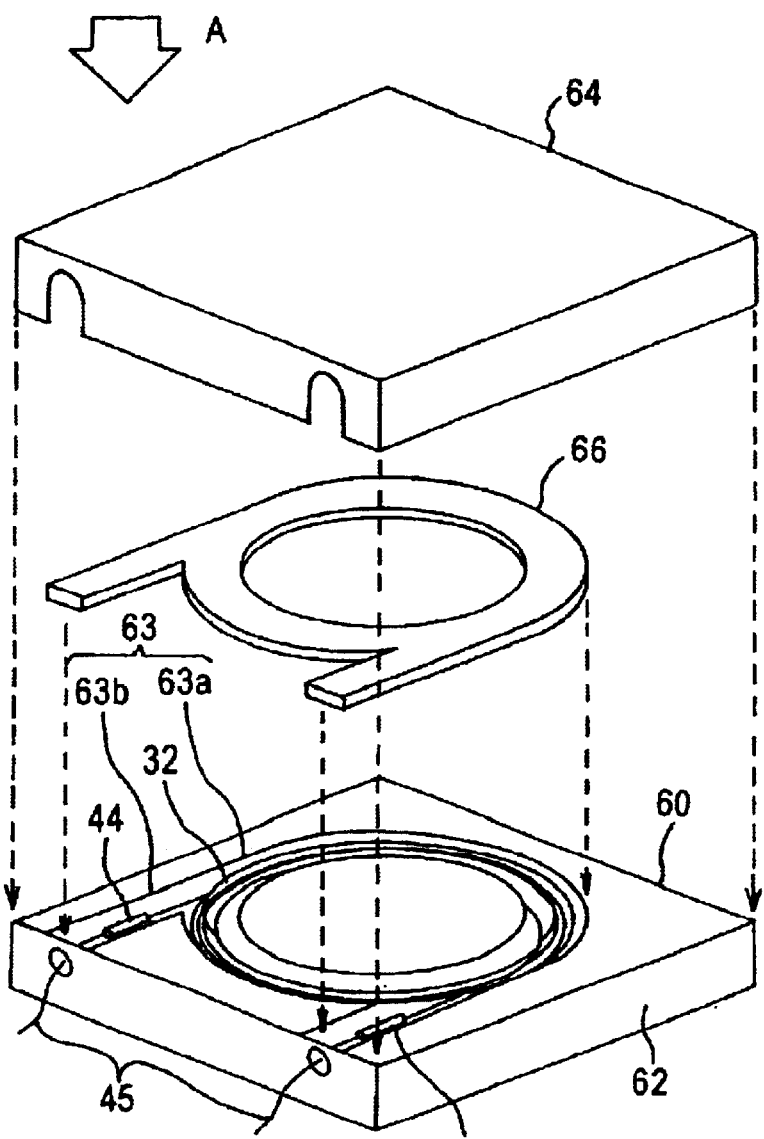

The dispersion compensator in accordance with a third embodiment will now be explained. In the dispersion compensator in accordance with the third embodiment, an optical fiber coil in a bundle form disposed within a storage case is secured by means of a cushion material acting as a coil-tidying member. FIG. 14 is an exploded perspective view of the third embodiment, whereas FIG. 15 is a perspective view of its cushion material 60.

Figure 15:
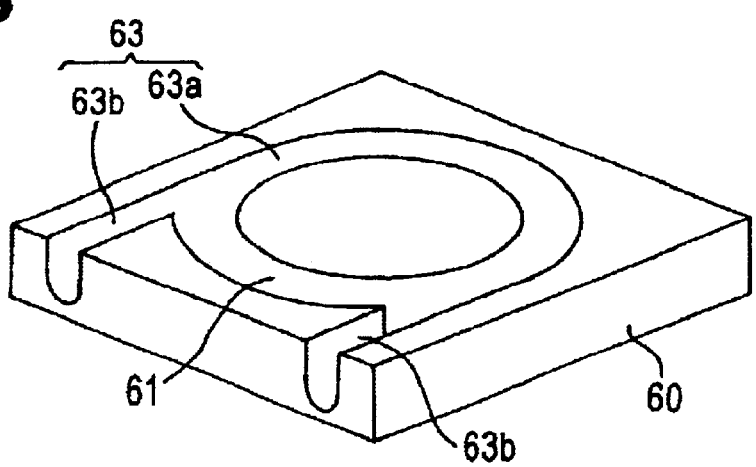
FIGS. 15 and 16 are perspective views of cushion materials thereof.

As shown in FIG. 15, the cushion material 60 for accommodating an optical fiber coil 32 has an outer shape in conformity to the inner form of a storage case 62, whereas its upper face is formed with an optical fiber coil storage section 61 formed into a groove in conformity to the form of the optical fiber coil 32. Namely, the optical fiber coil storage section 61 comprises an annular groove area 63a shaped in conformity to the optical fiber coil 32, and two linear groove areas 63b which are portions for drawing out the optical fiber coil 32. Preferably, the depth of the groove in the optical fiber coil storage section 61 is such that the optical fiber coil 32 is accommodated therein while leaving a margin for disposing a lid 66 of cushion material thereon. In this manner, the cushion materials 60 and 66 can surround the optical fiber coil 32. Though the cross section of the groove is U-shaped here, without being restricted thereto, it may be V-shaped or rectangular as well.

Referring to FIG. 14, an assembling method in accordance with this embodiment will now be explained. The cushion material 60 is put into the storage case 62, and the optical fiber coil 32 is accommodated in the annular groove area 63a of the optical fiber storage section 63 of the cushion material 60. Then, both ends of the DCF are drawn out from the optical fiber coil 32, and are connected to their corresponding pigtail fibers 45 at their respective fusion-splicing parts 44. Each fusion-splicing part 44 is accommodated in the linear groove area 63b of the optical fiber storage section 63, whereas the free end of each pigtail fiber 45 is drawn out of the storage case 62. Thereafter, the lid 66 of cushion material is placed so as to mate with the optical fiber storage section 63, and the storage case 62 is closed with a lid 64. As a result, the optical fiber coil 32 is secured, whereby the dispersion compensator in accordance with this embodiment is accomplished.

Here, the lid 66 of cushion material preferably has a form covering the opening area of the optical fiber storage section 63, and it is more preferable that this form be substantially identical to the opening form of the optical fiber storage section 63. It is due to the fact that the optical fiber coil 32 can be covered with the cushion materials 63 and 66 thereby.

It is required for the cushion materials 60 and 66 to be processed easily, be soft enough so as not to damage the optical fiber, and have such a low Young's modulus that they can deform elastically so as to surround the optical fiber with a slight pressure when accommodated. As such a cushion material, flexible polyurethane and polyethylene foam are preferable. In particular, polyethylene foam is preferable in practice due to its easiness in processing. However, any material can be used as long as the above-mentioned requirements are satisfied.

Figure 16:
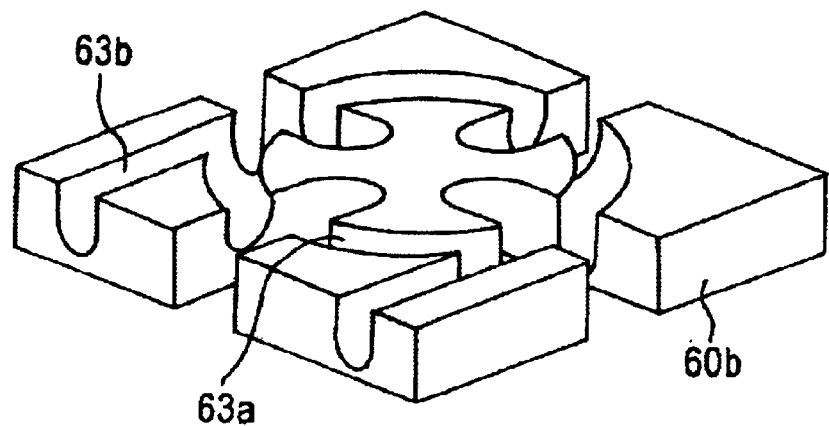

Also, the form of the cushion material 60 is not limited to that shown in FIGS. 14 and 15. For example, a cushion member 60b having a form shown in FIG. 16 may be used as well. This cushion material 60b has a form in which the cushion material 60 shown in FIG. 15 is partly cut off. As a result, the annular groove area 63a of the optical fiber storage section 63 has a divided form. This configuration is advantageous in that, even when the outer form of the cushion material 60b is slightly greater than the inside of the storage case 62, the cushion material 60b can easily be accommodated in the storage case 62, and that the cushion material 60b can reliably be secured into the storage case 62 due to its elastic deformation.

An impact test was carried out under the same condition as that of the first and second embodiments while using polyethylene foam (product code: PE Light B4, manufactured by INOAC Corporation; having a density of 0.027 g/cm$^3$) as the cushion members 60 and 66, results of which will now be reported. The direction of impact application was indicated by the arrow A in FIG. 14, i.e., perpendicular to the plane including the optical fiber coil 32. Even after this impact test, no disorder in winding occurred in the optical fiber coil. Also, no increase in transmission loss was found when the transmission loss value was measured at a wavelength of 1.55 μm, and no increase in loss other than that inherent in the optical fiber was found when measured after the temperature was raised to 70° C.

As explained in the foregoing, when the optical fiber coil 32 is accommodated in the optical fiber storage section 63 formed by recessing the cushion member 60, then the optical fiber coil 32 can be accommodated in the storage case 62 in a bundle state substantially released from distortions in winding, without causing the winding to become disordered. As a consequence, the optical fiber coil is prevented from being broken or changing its characteristics due to vibrations, impacts, and the like, and it is possible to obtain a small-sized dispersion compensator whose transmission loss value and temperature dependence of transmission loss are reduced.

Fourth Embodiment

The dispersion compensator in accordance with a fourth embodiment will now be explained. In the dispersion compensator in accordance with the fourth embodiment, as shown in FIG. 17, an optical fiber coil 48 wound around a bobbin 2 is secured to the bobbin 2, also acting as a storage section, with the aid of a cushion material 68 which is a coil-tidying member.

As the cushion material 68 is held between the flanges 26 on both sides of the bobbin 2 and is wound around the whole outer periphery of the flanges 26, the optical fiber coil 48 is secured to the flanges 26. The cushion material 68 is secured to the flanges 26 with a resin. Preferably, the resin is applied so as not to adhere to the optical fiber coil 48. The size of the cushion material 68 varies depending on the size of the flanges 26 used, the number of turns of the DCF, and the like. In the case where an optical fiber coil similar to that of the second embodiment is used, the cushion material 68 is preferably formed into a rectangular parallelepiped having a thickness of 3 mm, a width of 18 mm in conformity to the winding width of the coil, and a length of about 628 mm in conformity to the outer peripheral length of the flanges 26.

Figure 17:
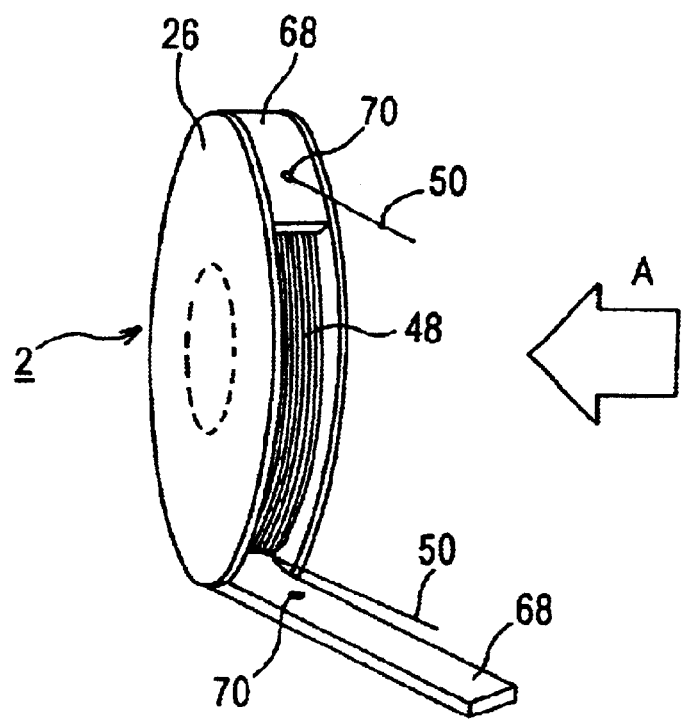
Figure 18:
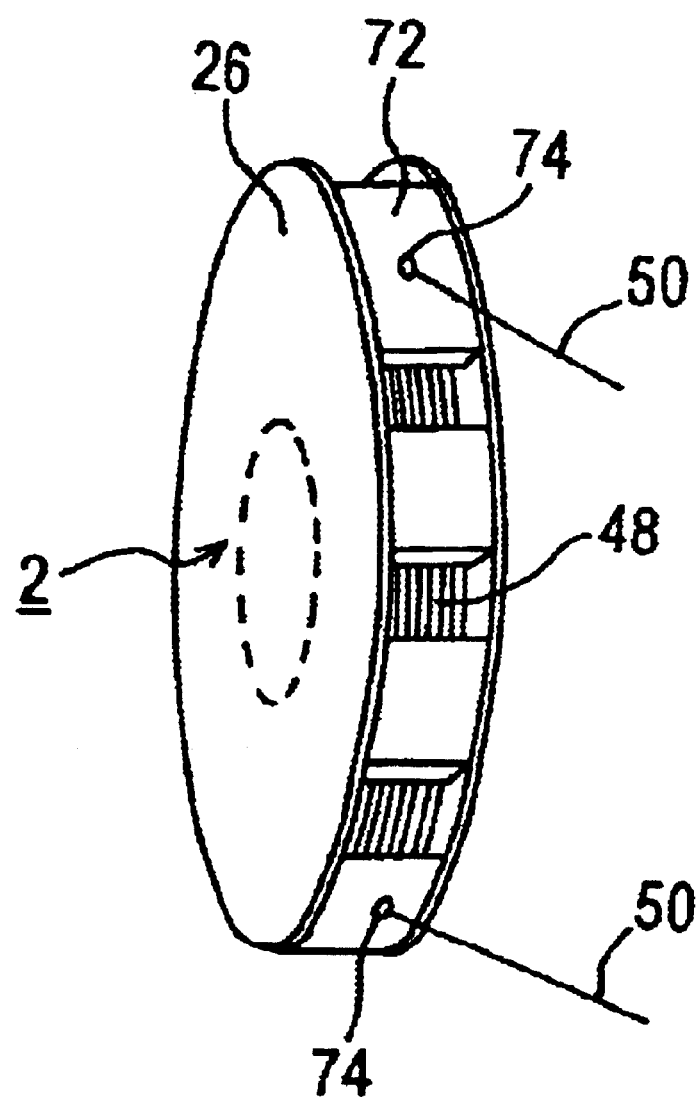
FIG. 18 is a perspective view of a modified example thereof.

The form of the cushion member is not limited to that shown in FIG. 17. As shown in FIG. 18, a plurality of thin rectangular parallelepiped cushion materials 72 may be disposed at a plurality of positions, so as to secure the optical fiber coil 48 to the flanges 26. Also, the cushion material 68 is preferably provided with outlets 70 for the DCF wound into a coil form.

Though the cushion material has characteristics identical to those of the third embodiment, a silicone resin is preferably used as its resin. However, any resin may be used as long as it does not peel off when a heat history is applied thereto within the range of about 0° C. to about 70° C., which is assumed for an environment of use.

Thus accommodated optical fiber coil was subjected to an impact test carried out under the same condition as that of the third embodiment. The direction of impact application was indicated by the arrow A in FIG. 17, i.e., perpendicular to the plane including the optical fiber coil 48. Even after this impact test, no disorder in winding occurred in the optical fiber coil 48. Also, no increase in transmission loss was found when the transmission loss value was measured at a wavelength of 1.55 μm, and no increase in loss other than that inherent in the optical fiber was found when measured after the temperature was raised to 70° C.

As explained in the foregoing, when the optical fiber coil 48 wound around the bobbin in a state substantially released from distortions in winding is secured with the cushion material 68, then the optical fiber coil 48 can reliably be secured to the bobbin without causing the winding to become disordered. As a consequence, the optical fiber coil is prevented from being broken or changing its characteristics due to vibrations, impacts, and the like, and it is possible to obtain a small-sized dispersion compensator whose transmission loss value and temperature dependence of transmission loss are reduced.

Fifth Embodiment

The dispersion compensator in accordance with a fifth embodiment will now be explained. In the dispersion compensator in accordance with the fifth embodiment, the storage case in the first embodiment is further filled with a cushioning filler so as to secure the optical fiber coil.

Figure 19:
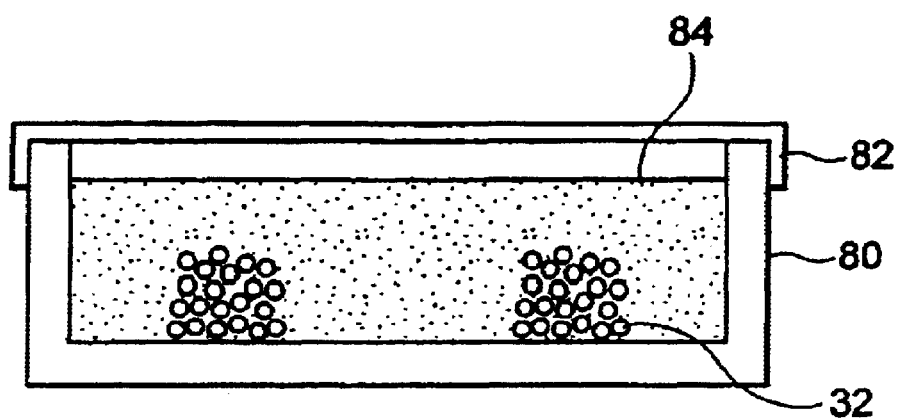

FIG. 19 shows a sectional configurational view of this embodiment. As with the first embodiment, an optical fiber coil 32 in a state substantially released from distortions in winding is accommodated in a storage case 80 having a rectangular or circular bottom face. The storage case 80 is filled with a filler 84 which surrounds the optical fiber coil 32. Here, the filler 84 preferably fills in between turns of the optical fiber constituting the optical fiber coil 32 as well. The storage case 80 is mounted with a lid 82 so as to be sealed therewith.

Figure 20:
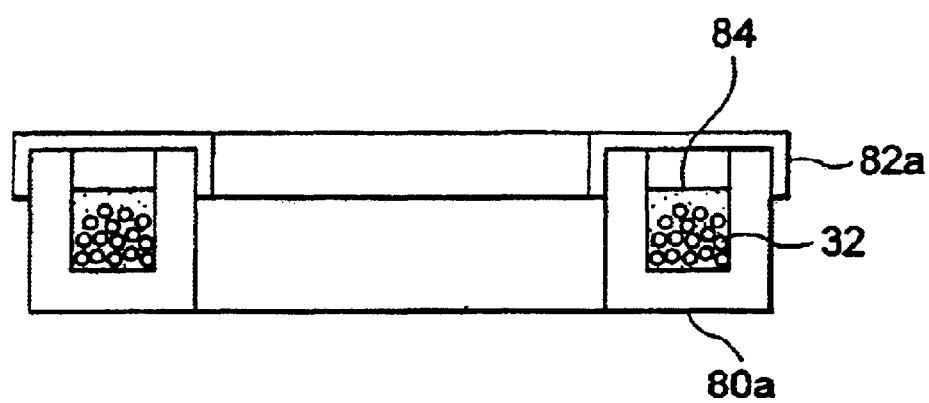
FIG. 20 is a sectional view of a modified example thereof.

Preferable as the filler 84 are thermosetting or UV-curable silicone resins having a Young's modulus of 0.05 kg/mm² or less; jelly-like admixtures having a high viscosity in which a rubber such as that of butadiene or silicon is swollen with a solvent, such as silicone or naphthene, and other resins or the like are optionally added thereto; and the like. As such a highly flexible material with a high viscosity is used as a filler, the optical fiber constituting the optical fiber coil 32 can reliably be secured without applying thereto an excess force which may impart distortions in winding to the optical fiber. Also, as the filler fills in between turns of the fiber, the pressures applied to the individual turns of the fiber are homogenized, whereby the microbend loss occurring due to irregular lateral pressures can be suppressed. Consequently, a dispersion compensator using a small-diameter fiber (having a glass diameter of 100 μm or less and a coating thickness of 140 μm or less) or a fiber having a low Δn, which has conventionally been hard to use due to its high sensitivity to distortions in winding, can easily be made. When a small-diameter fiber is used, the optical fiber coil can be made compact, whereby the module can have a much smaller size. When a fiber having a low Δn is used, then the effective area $A_{\text{eff}}$ can be reduced, so as to suppress the nonlinear characteristic. The form of the storage case 80 is not limited to that shown in FIG. 19. It may have an annular configuration as with the storage case 80a shown in FIG. 20. Though FIGS. 19 and 20 depict the optical fiber coil 32 in a form in contact with the bottom face of the storage case 80 or 80a, the optical fiber coil 32 may be accommodated in the storage case 80 or 80a after a small amount of the filler is injected therein, before the rest of the filler is injected and cured therein, for example. This procedure is more preferable in that the pressure applied to the optical fiber coil 32 from the bottom face of the storage case 80 or 80a can be decreased.

The optical fiber coil 32 may also be accommodated in the storage case 80 or 80a after being produced in a manner similar to that of the first embodiment, or a DCF may be dropped into the storage case 80 or 80a and formed into a coil therein.

After the optical fiber coil 32 is formed in this way, a resin (filler) is applied onto the periphery of the coil and then cured. This curing can be thermal curing or ultraviolet curing, depending upon the properties of the resin. In an example of the thermal curing, the resin is cured by heating at 50° C. for 24 hours.

During the application operation of the filler (resin), the surface tension of the resin is preferably not more than 40 dyn/cm², in order to prevent creation of bubbles etc. between fiber windings in the coil form. In order to allow the resin to fully penetrate into the spaces between the fiber windings, it is also preferable that the viscosity of the resin under the application be kept not more than 10000 cs. Further, it is preferable that during the curing of the resin the viscosity of the resin be kept not more than 10000 cs for two or more hours from the start of curing. This is for the purposes of allowing the resin to fully penetrate into the spaces between the fiber windings and preventing occurrence of unwanted microbend during the curing.

As explained in the foregoing, when surrounded with the filler 84, the optical fiber coil 32 can be accommodated in the storage case 80 in a state where distortions in winding are substantially released, without causing the winding to become disordered. As a consequence, the optical fiber coil is prevented from being broken or changing its characteristics due to vibrations, impacts, and the like, and it is possible to obtain a small-sized dispersion compensator whose transmission loss value and temperature dependence of transmission loss are reduced.

Sixth Embodiment

The dispersion compensator in accordance with a sixth embodiment will now be explained. This embodiment differs from the fourth embodiment, in which the optical fiber coil is secured to the bobbin with the cushion material wound around the outer peripheral portion, in that the optical fiber coil is secured with a filler filling in between turns of the fiber constituting the optical fiber coil and between the fiber and the bobbin.

Figure 21:
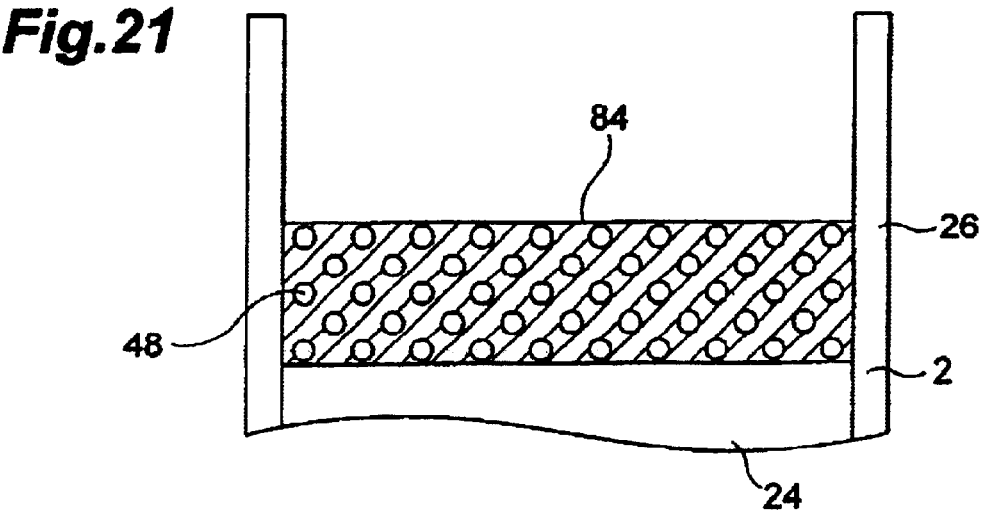

FIG. 21 is an enlarged sectional view of the sixth embodiment. A filler 84 fills in between turns of the optical fiber of the optical fiber coil 48 wound around the body portion 24 of the bobbin 2 and between the individual turns of the optical fiber and the outer peripheral surface of the body portion 24 of the bobbin 2 or the wall face of each flange 26. As the filler 84, a material identical to that of the filler of the fifth embodiment can be used.

As such a highly flexible material with a high viscosity is used as a filler, the optical fiber constituting the optical fiber coil 48 can reliably be secured without applying thereto an excess force which may impart distortions in winding to the optical fiber. Also, as the filler fills in between turns of the fiber, the pressures applied to the individual turns of the fiber are homogenized, whereby the microbend loss occurring due to irregular lateral pressures can be suppressed. Consequently, a dispersion compensator using a small-diameter fiber or a fiber having a low Δn, which has conventionally been hard to use due to its vulnerability to distortions in bending, can easily be made.

Also, in this embodiment, even in the case where aluminum or the like having a relatively high coefficient of thermal expansion is used as the bobbin 2, if the outer periphery of the body portion 24 of the bobbin 2 expands, then the filler 84 absorbs the stress caused by the expansion, so as to keep the stress from being transmitted to the optical fiber coil 48, whereby the optical fiber coil 48 can be prevented from being distorted upon thermal expansion. As a consequence, reliability improves, and it is unnecessary for the bobbin 2 to use an expensive material having a low thermal expansion, whereby the cost can be cut down.

Figure 22:
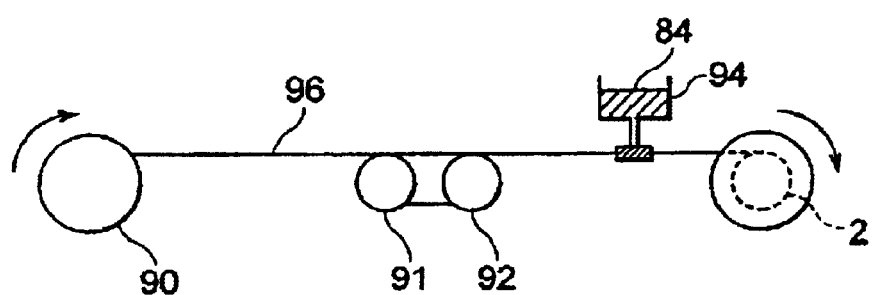
FIGS. 22 and 23 are views for explaining methods of making the same.
Figure 23:
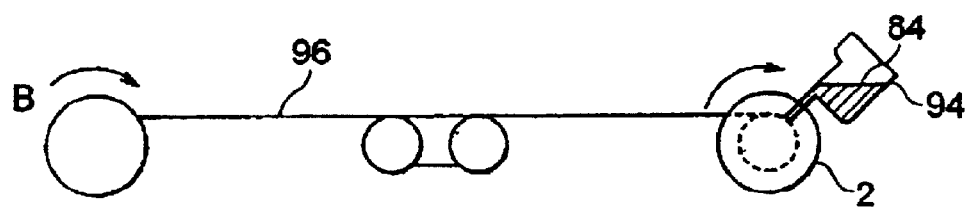

Methods of making the dispersion compensator in accordance with the sixth embodiment will now be explained. FIGS. 22 and 23 are views for explaining these methods.

In the method shown in FIG. 22, a DCF 96 wound around a feed bobbin 90 is taken up around the bobbin 2 by way of capstan rollers 91, 92. Here, the outer periphery of the DCF 96 is substantially uniformly coated with a filler 84 in a liquid form by a coating means 94 disposed in front of the bobbin 2. As a result, the interstices in the DCF 96 wound around the bobbin 2 are substantially uniformly filled with the filler 84.

In the method shown in FIG. 23, the coating means 94 is disposed on the side of the bobbin 2, so as to apply the filler 84 to the outer peripheral surface of the body portion 24 of the bobbin 2, i.e., the surface around which the DCF 96 is being wound or has already been wound. As a consequence, the interstices of the DCF 96 being wound can reliably be coated with the filler 84.

As explained in the foregoing, when the filler 84 is placed between the turns of the optical fiber coil 48 wound around the bobbin 2 in a state substantially released from distortions in winding, then the optical fiber coil 48 can reliably be secured to the bobbin without causing the winding to become disordered. As a consequence, the optical fiber coil is prevented from being broken or changing its characteristics due to vibrations, impacts, and the like, and it is possible to obtain a small-sized dispersion compensator whose transmission loss value and temperature dependence of transmission loss are reduced.

Seventh Embodiment

Figure 24:
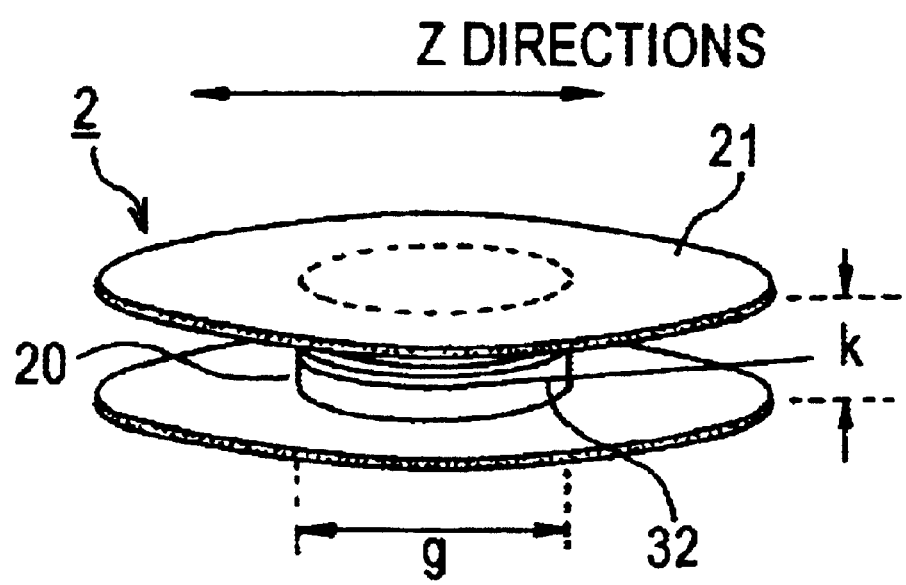
FIG. 24 is a perspective view showing a dispersion compensator in accordance with a seventh embodiment of the present invention.

In this embodiment, as shown in FIG. 24, a DCF is wound around a take-up bobbin 2, so as to form an optical fiber coil 32.

This embodiment is characterized in that, during or after being taken up, the optical fiber coil 32 is adjusted into a state substantially released from the above-mentioned distortions in winding. Various techniques can be employed for adjusting the optical fiber coil into this state, which will be explained in the following with reference to Examples A to L by way of illustration.

EXAMPLE A

Figure 2:
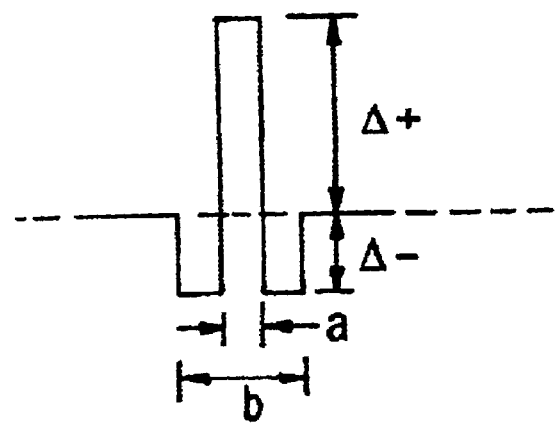
FIG. 2 is a view showing its refractive index profile.

Around a bobbin 2 made of aluminum in which g=120 mm and k=45 mm, about 90 plies of a DCF having a length of 9 km, the form shown in FIG. 1, and the refractive index profile shown in FIG. 2 were wound with a winding pitch of 0.28 mm at each of two kinds of take-up tensions of 50 gf and 70 gf, whereby two kinds of dispersion compensators were produced. This DCF has the specific characteristics shown in the following Table.

| Characteristics | Values |
|---|---|
| Δ+ | 2.5% |
| Δ− | −0.5% |
| a | 2.54 μm |
| b | 7.26 μm |
| c | 100 μm |
| d | 20 μm |
| e | 20 μm |
| f | 180 μm |
| Young's modulus of primary coating layer 13 | 0.06 kgf/mm$^2$ |
| Young's modulus of secondary coating layer 15 | 65 kgf/mm$^2$ |

Figure 25:
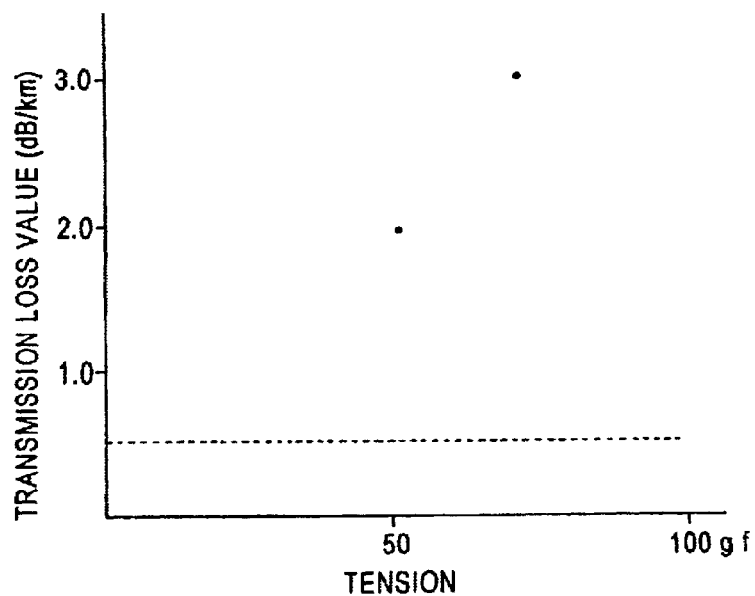
FIGS. 25 to 27 are charts each showing the tension dependence of the transmission loss value of an optical fiber coil.

FIG. 25 is a graph plotting thus obtained two kinds of dispersion compensators in terms of take-up tension and transmission loss value at a wavelength of 1.55 μm which are indicated by the abscissa and the ordinate, respectively. The broken line indicates the transmission loss value (0.53 dB/km) of the DCF at a wavelength of 1.55 μm in the state wound around a plastic bobbin having a body diameter of 280 mm, for comparison. In Example A, the transmission loss value was 3.01 dB/km and 1.98 dB/km when the take-up tension was 70 gf and 50 gf, respectively.

EXAMPLE B

Around a bobbin 2 made of aluminum in which g=60 mm and k=45 mm, about 190 plies of a DCF, identical to that of Example A, having a length of 13 km were wound with a winding pitch of 0.28 mm at each of three kinds of take-up tensions of 20 gf, 25 gf, and 50 gf, whereby three kinds of dispersion compensators were produced.

Figure 26:
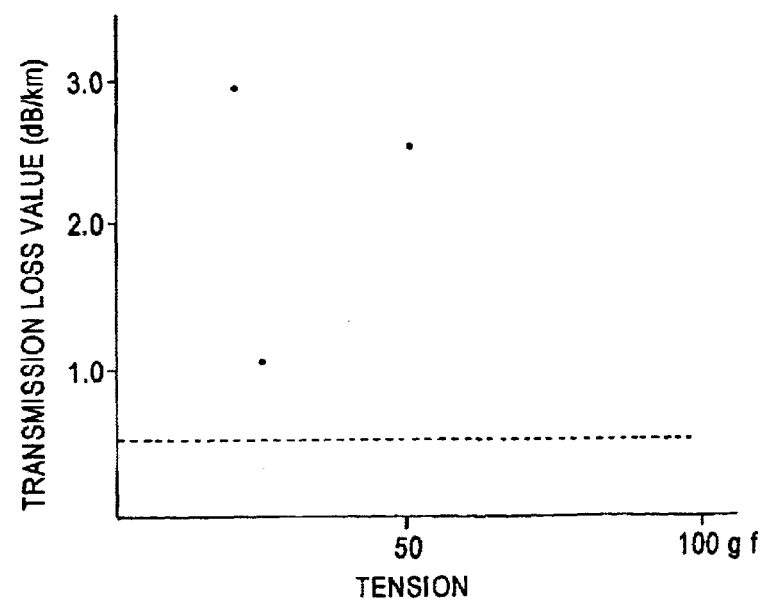

FIG. 26 is a graph plotting thus obtained three kinds of dispersion compensators in terms of take-up tension and transmission loss value at a wavelength of 1.55 μm which are indicated by the abscissa and the ordinate, respectively. The broken line is a transmission loss value shown for comparison as with FIG. 25. The transmission value was 2.54 dB/km and 1.05 dB/km when the take-up tension was 50 gf and 25 gf, respectively, thereby becoming smaller as the take-up tension was lower. At the take-up tension of 20 gf, however, the transmission loss value increased to 2.95 dB/km. It is assumed to be because the take-up tension was so low that the winding of the fiber loosened, thereby generating distortions in winding.

EXAMPLE C

Around a bobbin 2 made of aluminum in which g=100 mm and k=18 mm, about 210 plies of a DCF having a length of 8 km and the characteristics shown in the following Table (see FIGS. 1 and 2 for its form and refractive index profile, respectively) were wound with a winding pitch of 0.40 mm at each of four kinds of take-up tensions of 20 gf, 30 gf, 40 gf, and 50 gf, whereby four kinds of dispersion compensators were produced. This DCF has the specific characteristics shown in the following Table.

| Characteristics | Value |
|---|---|
| Δ+ | 2.1% |
| Δ− | −0.35% |
| a | 2.65 μm |
| b | 7.58 μm |
| c | 110 μm |
| d | 20 μm |
| e | 15 μm |
| f | 180 μm |
| Young's modulus of primary coating layer 13 | 0.03 kgf/mm² |
| Young's modulus of secondary coating layer 15 | 100 kgf/mm² |

Figure 27:
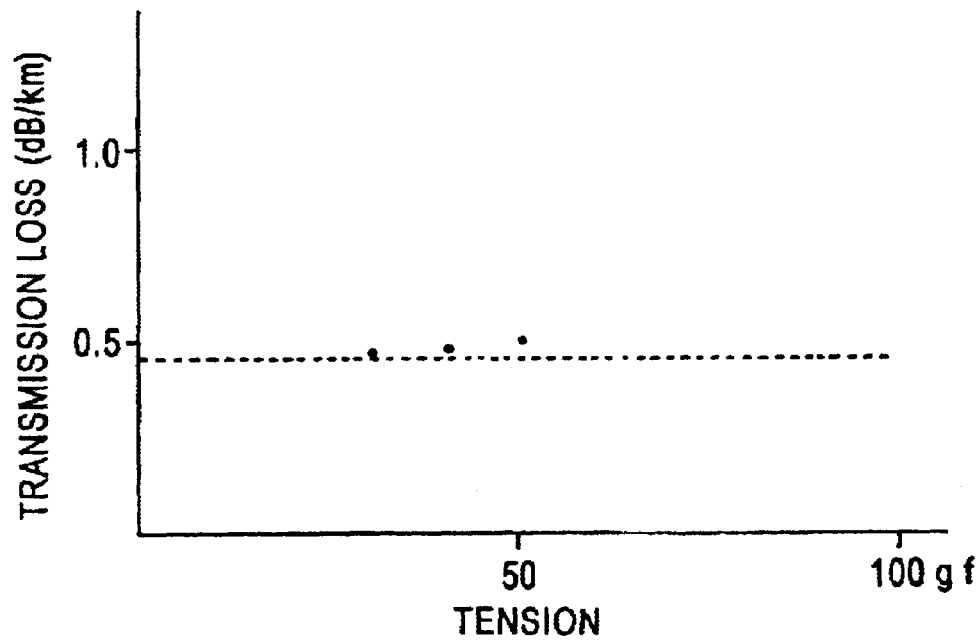

FIG. 27 is a graph plotting thus obtained four kinds of dispersion compensators in terms of take-up tension and transmission loss value at a wavelength of 1.55 μm which are indicated by the abscissa and the ordinate, respectively. The broken line also indicates take-up tension and transmission loss value by the abscissa and the ordinate, respectively. The broken line indicates the transmission loss value (0.45 dB/km) at a wavelength of 1.55 μm before the coil is taken up. The transmission loss value was 0.50 dB/km, 0.48 dB/km, and 0.46 dB/km when the take-up tension was 50 gf, 40 gf, and 30 gf, respectively, thereby becoming smaller as the take-up tension was lower. At the take-up tension of 20 gf, however, the winding of the fiber loosened, whereby the transmission loss value increased and exceeded 1.0 dB/km.

As can be seen from the relationship between transmission loss value and take-up tension in Examples A, B, and C, when the take-up tension for winding the optical fiber is lowered, then the increase in transmission loss value caused by the winding can be reduced. It has been confirmed that this take-up tension is preferably 50 gf or less, but more preferably at least 25 gf at which the winding of the fiber would not loosen. When the optical fiber coil is produced within such a range of take-up tension, then the lateral pressures occurring upon winding can be suppressed, whereby the increase in transmission loss value can be lowered. More preferably, the take-up tension is at least 30 gf but not greater than 40 gf. When the winding is carried out within such a tension range, the increase in transmission loss value can further be lowered.

EXAMPLE D

Around a bobbin 2 made of aluminum in which g=80 mm and k=45 mm, about 190 plies of a DCF having a length of 14 km and the characteristics shown in the following Table (see FIGS. 1 and 2 for its form and refractive index profile, respectively) were wound at a take-up tension of 35 gf with each of four kinds of winding pitches of 0.2 mm, 0.4 mm, 0.6 mm, and 1.0 mm, whereby four kinds of dispersion compensators were produced. This DCF has the specific characteristics shown in the following Table.

| Characteristics | Value |
|---|---|
| Δ+ | 2.1% |
| Δ− | −0.35% |
| a | 2.67 μm |

-continued

| Characteristics | Value |
|---|---|
| b | 7.63 μm |
| c | 98 μm |
| d | 20 μm |
| e | 30 μm |
| f | 198 μm |
| Young's modulus of primary coating layer 13 | 0.12 kgf/mm² |
| Young's modulus of secondary coating layer 15 | 50 kgf/mm² |

Figure 28:
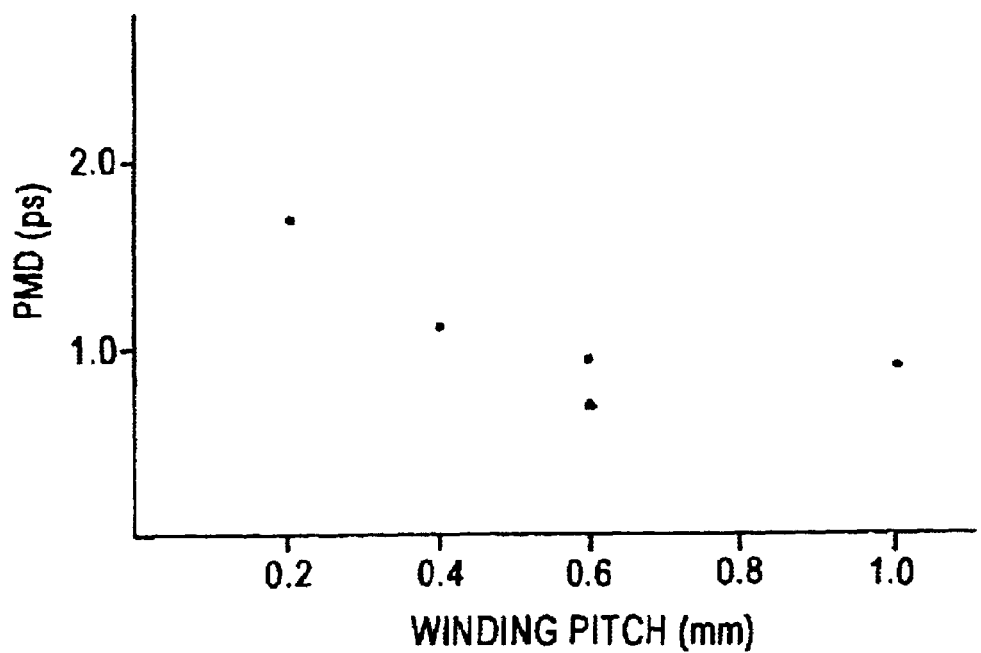
FIG. 28 is a chart showing the winding pitch dependence of PMD in an optical fiber coil.

FIG. 28 is a graph plotting thus obtained four kinds of dispersion compensators (with black circles) in terms of winding pitch and PMD which are indicated by the abscissa and the ordinate, respectively. While PMD was 1.68 ps when the winding pitch was 0.2 mm, it became 1.12 ps, 0.94 ps, and 0.90 ps at the winding pitches of 0.4 mm, 0.6 mm, and 1.0 mm, respectively. Hence, it has been confirmed that PMD can be lowered when the winding pitch is made greater as compared with the diameter of the DCF to be wound. Preferably, the ratio of the winding pitch to the DCF diameter is set to a value of 2 or greater, since PMD can considerably be lowered thereby. More preferably, this ratio is set to a value of 3 or greater, since the dependence on the winding pitch can be made very small thereby.

If the winding pitch is thus controlled at the time when the DCF is wound into a small-sized coil, then mode coupling occurs between orthogonal polarization modes, whereby PMD can be reduced.

On the other hand, the transmission loss of thus produced optical fiber coil at a wavelength of 1.55 μm was 0.46 dB/km when the winding pitch was 0.6 mm. This coil was heated to 80° C. at a temperature changing rate of 0.5° C./min, held for 1 hour at this temperature, and then returned to room temperature, at which the transmission loss value was measured again and found to be 0.44 dB/km, which was identical to the transmission loss value before coiling. The PMD at this time was 0.79 ps as indicated by the black triangle in the graph.

It has thus been confirmed that, when the winding pitch is controlled while the DCF is being wound into a small-sized coil, and the DCF is subjected to a heat treatment after being wound, then stress is alleviated, whereby the increase in transmission loss value can be reduced. Further, it has been confirmed that the increase in PMD can be reduced as well.

EXAMPLE E

Around a bobbin 2 made of aluminum in which g=100 mm and k=35 mm, about 120 plies of a DCF having a length of 6 km and the characteristics shown in the following Table (see FIGS. 1 and 2 for its form and refractive index profile, respectively) were wound at a take-up tension of 40 gf with a winding pitch of 0.8 mm, and then the bobbin was vibrated for 30 minutes, so as to substantially release distortions in winding, whereby a dispersion compensator was produced. This DCF has the specific characteristics shown in the following Table.

| Characteristics | Values |
|---|---|
| Δ+ | 2.5% |
| Δ− | −0.5% |

-continued

| Characteristics | Values |
|---|---|
| a | 2.57 μm |
| b | 7.34 μm |
| c | 115 μm |
| d | 0 μm |
| e | 70 μm |
| f | 225 μm |
| Young's modulus of secondary coating layer 15 | 40 kgf/mm² |

A vibration tester was used for applying the vibration to the bobbin, such that the displacement of the bobbin caused by the vibration over time drew a sinusoidal wave. The vibration frequency was 50 Hz, the maximum acceleration was 10 m/sec², and the vibration was generated in Z directions in FIG. 24. The transmission loss value of the optical fiber at a wavelength of 1.55 μm was 0.44 dB/km before coiling and increased to 0.45 dB/km after coiling. After the vibration was added thereto, the transmission loss value became 0.44 dB/km, i.e., returned to the value obtained before coiling.

It has thus been confirmed that, when a vibration is applied to the DCF, its radius of curvature can be increased or lateral pressures can be alleviated, whereby the increase in transmission loss value can be reduced. It is not necessary to apply the vibration continuously, as long as the total time of vibration is at least 30 minutes. For example, the vibration may be applied intermittently over a certain period of time as well.

The direction of vibration of the bobbin may not only be parallel to the flange surfaces of the bobbin (Z directions in FIG. 24) but also be substantially perpendicular to the flange surfaces of the bobbin, or may form a predetermined angle with these directions. When applying the vibration to the bobbin, it is preferably provided with means for preventing the winding of the optical fiber coil from becoming disordered, such as that shown in the above-mentioned third embodiment.

EXAMPLE F

Figure 29:
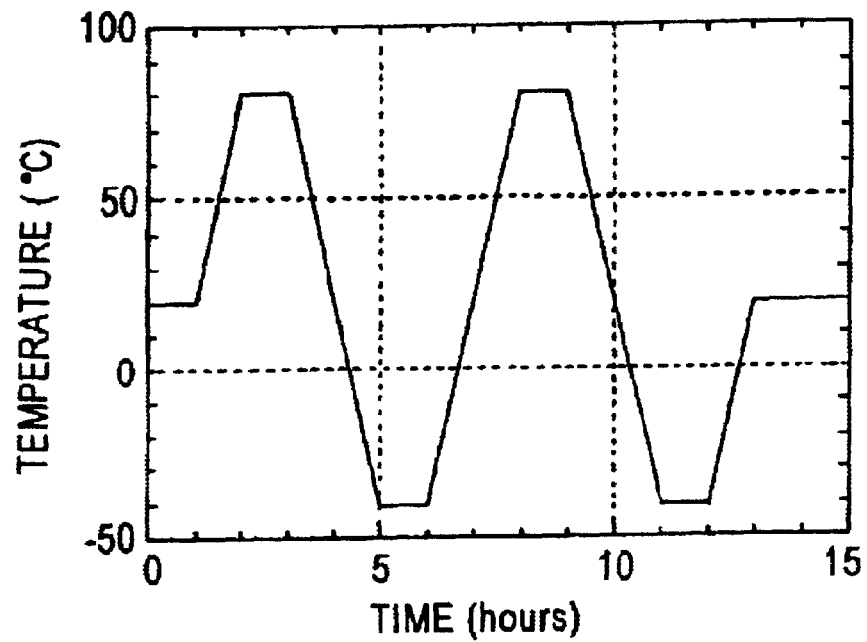

Around a bobbin 2 made of aluminum in which g=120 mm and k=45 mm, about 90 plies of a DCF, identical to that of Example A, having a length of 9 km were wound with a winding pitch of 0.28 mm at a take-up tension of 50 gf, and then a predetermined heat treatment was carried out, whereby a dispersion compensator was produced. FIG. 29 shows the heat cycle of this heat treatment, in which the initial temperature was 20° C., the range of temperature change was from 80° C. to −40° C., the temperature changing rate was 1° C./min, two cycles of heating and cooling were carried out with 1 hour of retention at each of 80° C. after heating and −40° C. after cooling, and retention at 20° C. was effected for 1 hour before changing temperature and for 2 hours before the termination.

Figure 30:
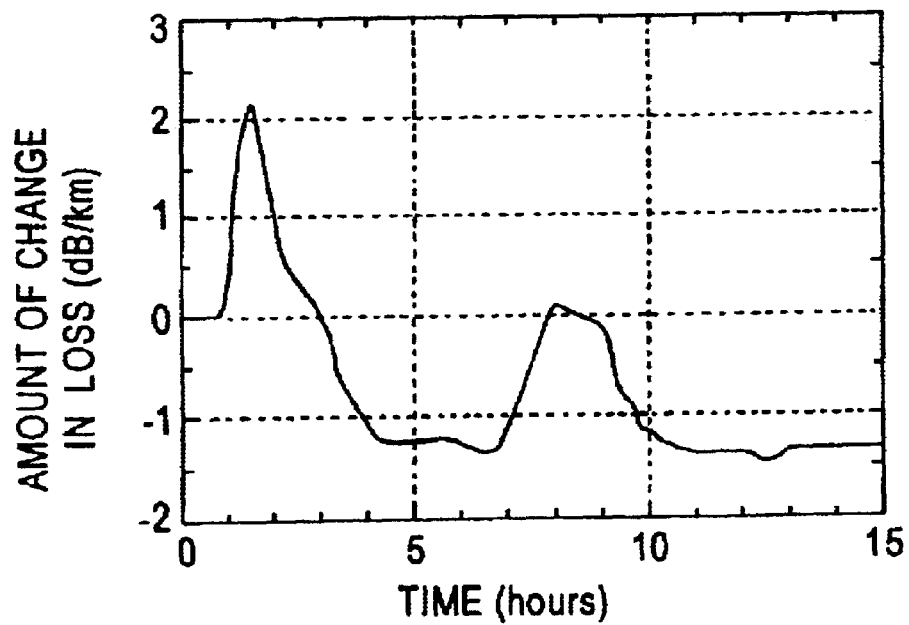
FIG. 30 is a chart showing how the transmission loss value changes over time when the coil is subjected to this heat cycle.

FIG. 30 shows the amount of change in transmission loss at a wavelength of 1.55 μm over time. Here, the transmission loss value before starting the heat treatment was 1.98 dB/km, whereas that in the state wound around a plastic bobbin having a body diameter of 280 mm was 0.53 dB/km. The change in transmission loss value caused by the heat treatment was about −1.4 dB/km, whereby the increase generated upon coiling disappeared. Such a heat cycle yielded a temperature change of ±60° C. with respect to the initial temperature as well. As can be seen from FIG. 30, after this heat cycle was carried out twice, the transmission loss value was substantially stabilized. It has thus been confirmed that the heat treatment can alleviate transmission loss.

EXAMPLE G

Figure 31:
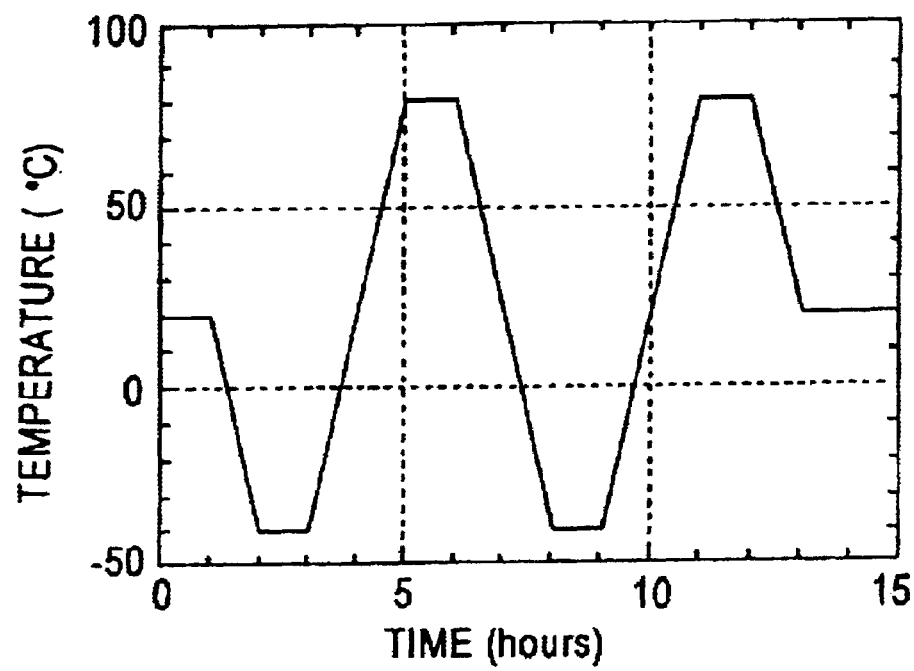
FIG. 31 is a chart showing how temperature changes in another heat cycle applied to the wound coil.

Around a bobbin 2 made of aluminum in which g=60 mm and k=45 mm, about 90 plies of a DCF, identical to that of Example A, having a length of 9 km were wound with a winding pitch of 0.28 mm at a take-up tension of 25 gf, and then a predetermined heat treatment was carried out, whereby a dispersion compensator was produced. FIG. 31 shows the heat cycle of this heat treatment, which is the same as that shown in FIG. 29 except that the order of the heating and cooling is reversed.

While the transmission loss value at a wavelength of 1.55 μm was 1.05 dB/km before the heat treatment, it became 0.53 dB/km after the heat treatment, whereby the increase generated upon coiling disappeared.

As can be seen from Examples F and G, in the case where the coiled DCF is subjected to a heat treatment, the coating shrinks when cooled to a temperature lower than that at the time of winding, whereas the stress is alleviated by heat when heated to a temperature higher than that at the time of winding, so that the radius of curvature of the wound DCF can be increased, whereby the increase in transmission loss value can be reduced. It has also been confirmed that, when the heat cycle is repeated a plurality of times, then the transmission loss value is stabilized with respect to the amount of change caused by heat.

EXAMPLE H

Around a bobbin 2 made of aluminum in which g=100 mm and k=18 nun, about 210 plies of a DCF, identical to that of Example C, having a length of 8 km were wound with a winding pitch of 0.40 mm at each of take-up tensions of 40 gf and 50 gf, and then their respective predetermined temperature changing treatments were carried out, whereby two kinds of dispersion compensators were produced.

The coil obtained at the take-up tension of 40 gf was subjected to a temperature changing treatment in which the coil was cooled from room temperature at a rate of 0.5° C./min, held for 1 hour at 0° C., and then returned to room temperature again. The coil obtained at the take-up tension of 50 gf was subjected to a temperature changing treatment in which the coil was cooled for 1 hour at −20° C. and then returned to room temperature. again.

While these coils yielded transmission loss values of 0.48 dB/km and 0.50 dB/km before their temperature changing treatments, respectively, both of them became 0.45 dB/km after the temperature changing treatments, whereby the increase caused by coiling disappeared.

It has thus been confirmed that the heat cycle may be carried out on the low temperature side alone. It is presumed to be due to the fact that the coating shrinks when cooled to a temperature lower than that at the time of winding, so that the radius of curvature of the DCF after winding can be enhanced. As a result, the transmission loss value can be lowered.

EXAMPLE I

Figure 32:
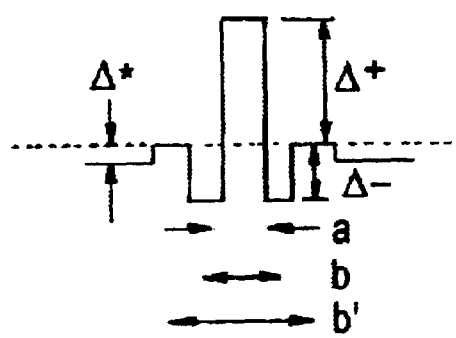
FIG. 32 is a view showing a refractive index profile of another DCF.

Around a bobbin 2 made of aluminum in which g=100 mm and k=35 mm, about 170 plies of a DCF having a length of 10 km, the structure shown in FIG. 1, the refractive index profile shown in FIG. 32, and the characteristics shown in the following Table were wound with a winding pitch of 0.50 mm at a takeup tension of 30 gf, and then a predetermined temperature changing treatment was carried out, whereby a dispersion compensator was produced.

| Characteristics | Values |
|---|---|
| Δ+ | 1.1% |
| Δ− | −0.5% |
| Δ* | 0.2% |
| a | 3.80 μm |
| b | 9.51 μm |
| b' | 13.38 μm |
| c | 100 μm |
| d | 25 μm |
| e | 45 μm |
| f | 240 μm |
| Young's modulus of primary coating layer 13 | 0.15 kgf/mm² |
| Young's modulus of secondary coating layer 15 | 90 kgf/mm² |

The heat treatment was such that the coil was heated at a temperature changing rate of 1° C./min from room temperature to 60° C., at which the coil was held for 3 hours, and then was returned to room temperature again. While the transmission loss value of the optical fiber at a wavelength of 1.55 μm was 0.98 dB/km before coiling, it increased to 1.01 dB/km after coiling. The transmission loss value after the heat treatment was 0.98 dB/km, whereby the increase in transmission loss generated upon coiling disappeared.

Thus, the heat cycle may be carried out on the high temperature side alone. When temperature is higher than that at the time of winding, then stress is alleviated by heat, whereby the radius of curvature of the DCF after winding can be enhanced. As a result, the transmission loss value can be made small. Though the effect of restoring the transmission loss value becomes greater as temperature is higher, the temperature must be lower than the glass transition point of the coating material of the DCF used, as a matter of course.

EXAMPLE J

Around a bobbin 2 made of aluminum in which g=70 mm and k=6 mm, about 500 plies of a DCF having a length of 8.5 km and the characteristics shown in the following Table (see FIGS. 1 and 2 for its form and refractive index profile, respectively) were wound at a take-up tension of 35 gf with a winding pitch of 0.3 mm, whereby a dispersion compensator was produced. This DCF has the specific characteristics shown in the following Table.

| Characteristics | Values |
|---|---|
| Δ+ | 2.1% |
| Δ− | −0.35% |
| a | 2.88 μm |
| b | 7.58 μm |
| c | 97 μm |
| d | 0 μm |
| e | 20 μm |
| f | 137 μm |
| Young's modulus of secondary coating layer 15 | 120 kgf/mm² |

The heat treatment condition was such that a cycle in which heating and cooling were effected at a temperature changing rate of 1° C./min with 1 hour of retention at each of 0° C. and 70° C. after cooling and heating, respectively, was repeated six times. Also, 1 hour of retention was effected at +20° C. before starting and terminating the heat treatment.

While the transmission loss value of the optical fiber at a wavelength of 1.55 μm was 0.51 dB/km before coiling, it increased to 0.55 dB/km after coiling. The transmission loss value after the heat treatment returned to 0.51 dB/km.

As mentioned in Examples F to J, when a coil is wound at a predetermined takeup tension and then is subjected to a heat treatment with a heat cycle in which the coil is placed at a temperature higher or lower than that at the time of winding for a predetermined period of time, then the transmission loss value can further be lowered. Substantially, the transmission loss value can be reduced to that of the optical fiber before winding.

The heat cycles are indicated here only by way of illustration, and would not be limited to those exemplified above, as long as the radius of curvature of the DCF can be enhanced after winding.

EXAMPLE K

Figure 33:
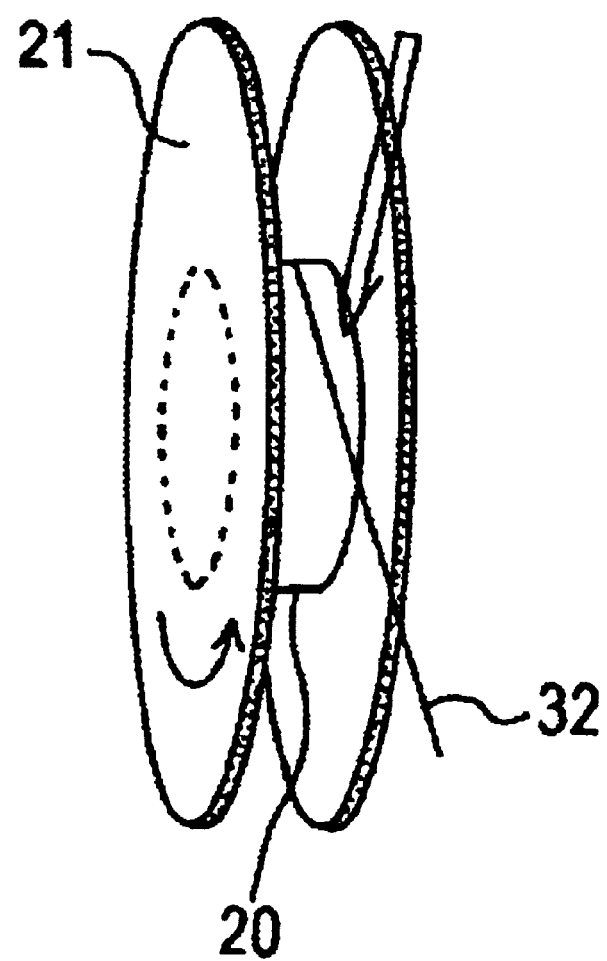
FIG. 33 is a schematic view showing how a DCF is wound around a coil while being heated.

Around a bobbin 2 made of aluminum in which g=70 mm and k=6 mm, about 500 plies of a DCF, identical to that of Example J, having a length of 8.5 km were wound at a take-up tension of 35 gf with a winding pitch of 0.3 mm while being heated, whereby a dispersion compensator was produced. The heating of the DCF was carried out such that, as shown in FIG. 33, a drier was used for directly applying hot air along the direction of the depicted arrow to the DCF 32 immediately before being wound around the body portion 20 of the bobbin 2 between flanges 21, while the hot air was controlled such that the temperature of the coil surface became 80° C.

The transmission loss value of thus produced optical fiber coil at a wavelength of 1.55 μm after cooling was 0.51 dB/km, which was the same as that before winding.

Thus, when the DCF was heated while being wound, the resulting heat acts to enhance the radius of curvature of the wound DCF, whereby the increase in transmission loss value can be reduced. Namely, the stress of the coating resin is alleviated in the process of being cooled to room temperature. As can also be seen from other Examples, the predetermined temperature of heating is preferably within the range of at least 60° C. but not higher than the glass transition point of the coating resin. The temperature range is more preferably within the range of at least 80° C. but not higher than the glass transition point of the coating resin, since the transmission loss value can fully be lowered thereby.

Though both of the DCF and bobbin are heated to a predetermined temperature in this Example, at least one of them may be held at the predetermined temperature as well. Even in the latter case, stress is alleviated when temperature decreases after the completion of winding, whereby the increase in transmission loss value can be reduced.

Further, when setting the DCF to a predetermined temperature, it is not necessary for the whole DCF being wound to be placed at the predetermined temperature. It will be sufficient if, of the DCF, at least the part wound around the bobbin is heated to the predetermined temperature. Even in the latter case, stress is alleviated when temperature decreases after the completion of winding, whereby the increase in transmission loss value can be reduced.

EXAMPLE L

A dispersion compensator similar to that of Example J was produced by using a DCF which differed from the fiber of Example J only in that the Young's modulus of its coating portion was 1 kgf/mm$^2$.

The transmission loss value of this dispersion compensator was 0.51 dB/km, and no increase in transmission loss value caused by winding was seen. Namely, the transmission loss value was substantially reduced to that before winding.

That is, as a coating layer having a low Young's modulus was disposed on the side face of the optical fiber, the coating layer acted as a buffer layer, whereby it was possible to reduce the increase in transmission loss value. Here, the action as the buffer layer becomes more effective as Young's modulus is lower. Consequently, when the optical fiber is coated with a coating material having a Young's modulus lower than that of the coating material for the fiber used in Example J, i.e., 120 kgf/mm$^2$, then its transmission loss value is expected to decrease due to the buffer action. Namely, when the optical fiber has a coating layer made of a coating material having a Young's modulus of at least 1 kgf/mm$^2$ but less than 120 kgf/mm$^2$ on its outer peripheral surface, then the transmission loss value of the optical fiber coil formed by winding this optical fiber around the bobbin can be made smaller than that of the optical fiber coil in Example J.

The measured values of Young's modulus mentioned in the foregoing Examples are those at 20° C. Their method of measurement will now be explained.

First, the coated optical fiber was cut into a short piece with an appropriate length. After this short piece of the coated optical fiber was immersed in acetone, the glass portion of the coated optical fiber was pulled out, and only the remaining coating layer portion was dried. Two gauge marks were set in the dried coating so as to be axially separated from each other by a distance of 25 mm, and the Young's modulus was calculated from the load at the time when the distance between the gauge marks expanded by 2.5% as the coating layer portion was pulled at a pulling rate of 1 mm/min. The equation for calculating Young's modulus is: (Young's modulus)=(tensile load (kgf) upon 2.5% expansion)÷(cross sectional area (mm$^2$) of the resin surface perpendicular to the pulling direction)÷0.025.

In the foregoing, the treatments for eliminating distortions in winding are explained with reference to Examples A to L by way of illustration. These treatments are effective in enhancing the radius of curvature bent by the lateral pressures generated upon coiling the optical fiber or in reducing the lateral pressures themselves.

The optical fiber in accordance with each embodiment explained above can also exhibit the effects of the present invention when it has, on its outer peripheral surface, a coating layer comprising a primary coating layer of a coating material having a Young's modulus of at least 0.03 kgf/mm$^2$ but not greater than 0.15 kgf/mm$^2$ and a secondary coating layer of a coating material having a Young's modulus of at least 50 kgf/mm$^2$ but not greater than 100 kgf/mm$^2$ disposed on the primary coating. Similarly, the optical fiber exhibits the effects of the present invention when it has a coating layer made of a coating material having a Young's modulus of at least 1 kgf/mm$^2$ but not greater than 120 kgf/mm$^2$ disposed on its outer peripheral surface. Also, the effects of the present invention can similarly be exhibited when the coating layer has a thickness of at least 20 μm but not greater than 70 μm. Further, the effects of the invention become valid when the DCF has a length of 6 km or greater, the body portion of the bobbin has a diameter of 120 mm or less, the coil has a winding width of 45 mm or less, and the number of turns of the coil is 500 or less.

Finally, methods of using a wavelength dispersion compensator, which is one of coiled optical assemblys in accordance with the present invention, will be explained with reference to FIGS. 34 to 37.

Figure 34:
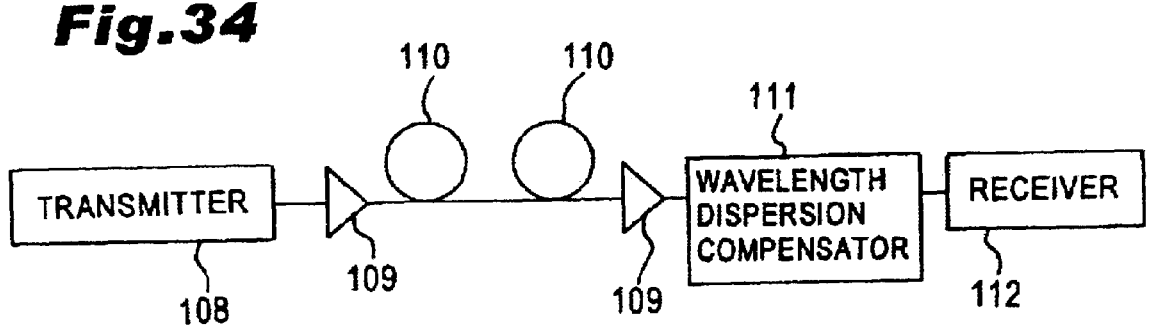

FIG. 34 is a configurational view of an optical transmission system using an optical dispersion compensator in accordance with the present invention. In this optical transmission system, the output end of an optical amplifier 109 connected to the output side of a transmitter 108 is connected to one end of an optical fiber transmission line 110. The other end of the optical fiber transmission line 110 is connected to the input end of another optical amplifier 109. The output end of this optical amplifier 109 is connected to a wavelength dispersion compensator 111 and then to the input end of a receiver 112. When the wavelength dispersion compensator 111 of the present invention is thus used in an optical transmission system, then the distortions in optical signals generated in the optical fiber transmission line 110 can be compensated for with low transmission loss or low PMD.

Figure 35:
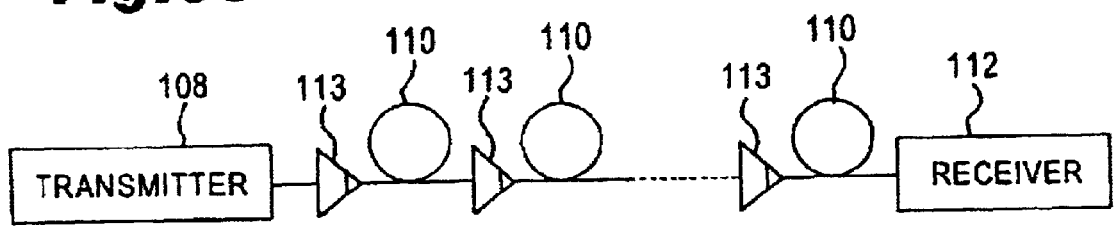
Figure 36:
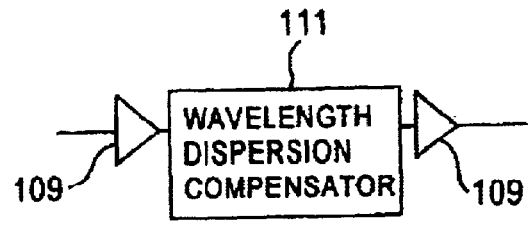
FIGS. 36 and 37 are configurational views of optical amplifiers each having a dispersion compensator.
Figure 37:
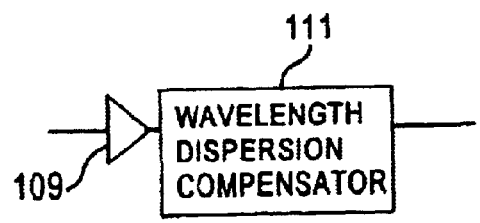

FIG. 35 is a configurational view of another optical transmission system using an optical dispersion compensator in accordance with the present invention. In this optical transmission system, an optical amplifier 113 equipped with a wavelength dispersion compensator, which is connected to the output of a transmitter 108, is connected to one end of an optical fiber transmission line 110. Also, at least one optical amplifier 113 equipped with a wavelength dispersion compensator is disposed in the middle of the optical fiber transmission line 110 when necessary, whereas a receiver 112 is connected to the other end of the optical fiber transmission line 110. The optical amplifier 113 equipped with a wavelength dispersion compensator is configured, for example, as shown in FIG. 36, such that its input and output are provided with optical amplifiers 109, with a wavelength dispersion compensator 111 disposed therebetween, so as to amplify optical signals while suppressing distortions thereof. Also, it may be configured such that, as shown in FIG. 37, its input is provided with an optical amplifier 109, while a wavelength dispersion compensator 111 is connected to the output thereof. When the wavelength dispersion compensator of the present invention is thus used, then the distortions in optical signals generated in the optical fiber transmission line 110 can be compensated for with low transmission loss or low PMD.

Next described is the eighth embodiment of the dispersion compensator according to the present invention. The present embodiment is different from the fifth embodiment in that the winding shape of the optical fiber coil is not a regular circle.

Figure 38:
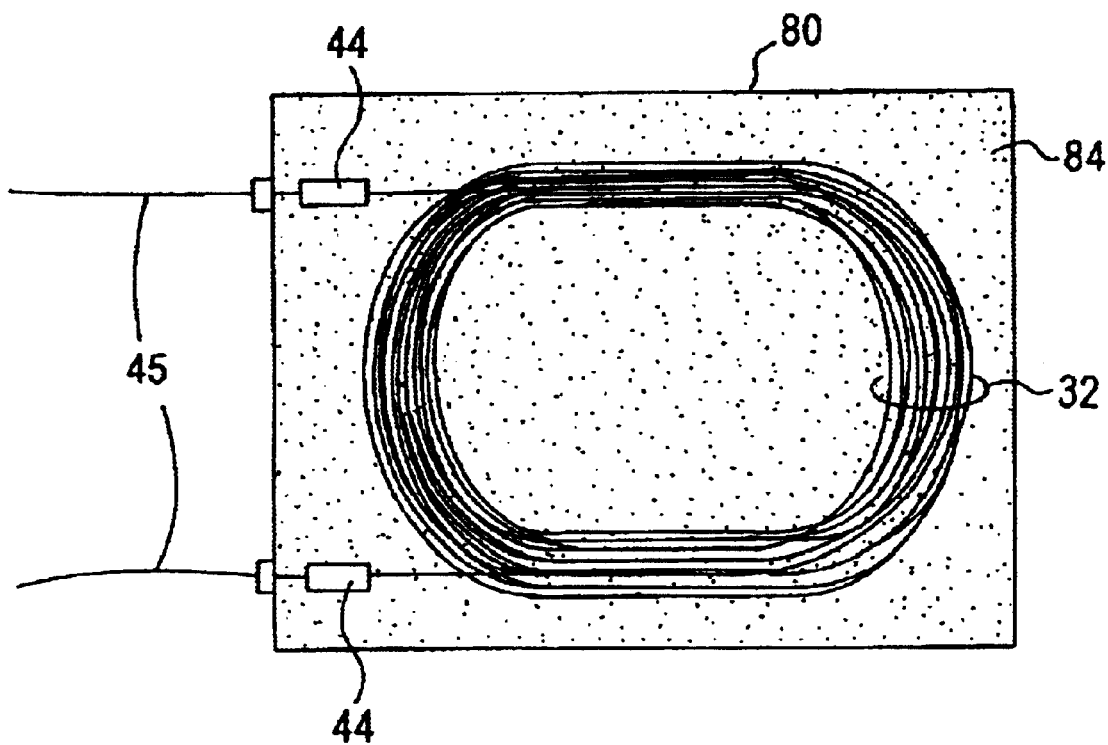
FIG. 38 is a plan view to show the eighth embodiment of the dispersion compensator according to the present invention in the state in which the container lid is taken off.

FIG. 38 is a plan view to show the state of the embodiment from which the container lid 82 is taken off. The cross-sectional view of this embodiment is substantially the same as that of FIG. 19. In this embodiment, as illustrated in FIG. 38, the winding shape of the optical fiber coil 32 is a nearly rectangular shape with round corners fitted to the housing 80. When the winding shape is fitted to the inside shape of the housing 80 in this way, the fiber length of each winding can be longer than in the case of the winding shape of the regular circle. This permits the housing 80 to be constructed in smaller size, whereby the dispersion compensator can be made more compact.

The dispersion compensator was fabricated in the following way; the DCF used was the same as in the fifth embodiment, this DCF 10 km long was wound around the bobbin having the cylinder diameter of 120 mm and the largest outside diameter of 200 mm, the optical fiber coil 32 thus formed was taken off from the bobbin and loosened into a bundle state, it was then set in the winding shape of the approximate rectangle as illustrated in FIG. 38 in the housing 80 having the inside dimensions of 210×130 mm, and the same filler as in the fifth embodiment was charged into the housing.

The optical fiber before the winding has such characteristics that at the wavelength 1.61 μm the chronomatic dispersion coefficient was −120 ps/nm/km and the chromatic dispersion slope was −034 ps/mm$^2$/km. The optical fiber had the transmission loss of 0.63 dB/km in the wound state on the bobbin. In contrast with it, the dispersion compensator of the present embodiment fabricated had the transmission loss of 0.41 dB/km, and the loss decrease of 0.22 dB/km was accomplished by loosening the windings of the optical fiber coil, which verified the effectiveness of the present embodiment to the loss decrease.

The present embodiment showed the example of the rectangular winding shape with round corners, but the winding shape may also be the shape of an ellipse, an ovoid form, or the like. Since the optical fiber coil is loosened into the bundle shape in the present embodiment, it is easy to adjust the winding shape so as to be fitted to the inside shape of the housing.

The filler (resin) used in the fifth, fifth, and eighth embodiments described above preferably has the following features.

The undisturbed penetration defined in JIS K 2200 is preferably between 5 and 200 both inclusive at 25° C. Further, the undisturbed penetration is more preferably between 5 and 200 both inclusive in the practical operation temperature range (−40° to 100° C.). The reason is as follows: if the undisturbed penetration is below 5 the loss will become too large for practical use on the long wavelength side because of the microbend of optical fiber; and if it is over 200 the optical fiber coil will fail to keep its shape.

An amount of hydrogen evolving from the resin is preferably not more than 0.001 ml/g during the thermal treatment of 60° C.×24 hours. The reason is that the amount of evolving hydrogen over it will increase the loss of the optical fiber over the range of practical use.

The refractive index of the resin is preferably higher than that of the optical fiber. The reason is as follows: if the refractive index of the resin is lower than that of the cladding, unwanted light occurring at the optical fiber splices will propagate in the cladding; whereas, if the refractive index is higher the unwanted light occurring at the optical fiber splices will be guided efficiently to the outside of the optical fiber.

The resin satisfying these conditions is the silicone resin and an example thereof is KJR-9010 in the KJR series available from Shin-Etsu Chemical Co., Ltd.

The resin preferably contains a hydrogen absorber, for example, one selected from palladium alloys, La—Ni alloys, La—Ni—Mn alloys, and La—Ni—Al alloys. When the resin contains the hydrogen absorber, hydrogen can be prevented from penetrating into the optical fiber, so as to suppress increase of transmission loss due to hydrogen in the optical fiber.

As for the optical fiber forming the optical fiber coil, the present invention allows even use of the optical fiber having the bending loss of 1 dB/m or more under bending in the diameter of 20 mm at the wavelengths in the use wavelength band, use of which was difficult before.

It is also preferable to interpose a thin film having at least either one of a function of improving the strength of the optical fiber and a function of restraining intrusion of hydrogen into glass, a specific example of which is a carbon coating, between the glass of the optical fiber and the covering over it. This restrains growth of microcracks in the surface and prevents hydrogen from intruding into the glass, thereby preventing degradation of the optical fiber.

Further, the largest outside diameter of the optical fiber, i.e., the diameter of the covering is preferably not more than 150 μm in terms of compactification of the optical fiber.

The covering of the optical fiber is preferably an ultraviolet-curing resin having the Young's modulus in the range of 0.1–20 kg/mm$^2$. The reason is as follows: if the covering resin has the Young's modulus below 0.1 kg/mm$^2$ the resin will become so sticky as to adhere the optical fiber windings to each other after wound around the bobbin; if the Young's modulus is over 20 kg/mm$^2$ the optical fiber will increase the loss on the long wavelength side. An example of such resin is an urethane acrylate base ultraviolet-curing resin.

Further, the cladding diameter of the optical fiber is preferably not more than 100 μm. The reason is as follows: when the cladding diameter is not more than 100 μm, the capacity occupied by the optical fiber is small, so that the optical fiber coil itself can be formed in compact size; among optical fibers having an equal outside dimension, the smaller the cladding diameter, the larger the minimum bending curvature, so as to improve optical characteristics of the optical fiber related to the bending loss. On the other hand, the decrease in the cladding diameter will result in decreasing the rigidity of glass and bringing about microbend even with small external force to raise the possibility that the loss increases on the long wavelength side of the wavelengths used. When the fiber is coated with the resin as in the present invention, influence of external force is relieved and it permits use of the small diameter of not more than 100 μm, which was hard to use heretofore.

Further, the pull-out force of the optical fiber of the optical fiber coil is preferably not more than 120 g. When the pull-out force is not more than 120 g, the external force from the covering can be reduced on the glass of the optical fiber. The pull-out force herein can be measured by the following measuring method.

1) First, a paper pattern of 25×25 mm is prepared.

2) The fiber is fixed with the both ends thereof projecting from the both sides of the paper pattern with an adhesive, for example, Aron Alpha (jelly)+Aron Alpha setter.

3) The fiber and the adhesive are separated in the range of 10 mm from the one edge of the paper pattern with a knife.

4) A cut is made only in the hard part out of the fiber covering on the paper pattern portion on the separate side.

5) The glass part is broken by bending the cut portion formed in above 4), by 90°.

6) It is set in a test machine and the glass part is drawn out. The tensile force (pull-out force) is measured and the measurement is carried out by continuously pulling the glass part until it is drawn out. The tensile force thus obtained is defined as the pull-out force.

In the optical fiber of the optical fiber coil, a clearance of not less than 1 μm is preferably present between the glass part and the covering part thereon. This can restrain the external force from the covering on the optical fiber of the optical fiber coil.

At the input and output ends of the optical fiber coil in the above fifth, fifth, and eighth embodiments, optical fibers 45, for example SMFs or DSFs, different from the optical fiber coil are spliced by fusion to the ends of the optical fiber of the optical fiber coil 32 at fusion splices 44 so as to extend as terminals of the pigtail type to the outside of the dispersion compensator. It is also preferable that the splices 44 be surrounded by the resin 84 retaining the optical fiber coil, as illustrated in FIG. 38. The bending loss of the optical fiber spliced in the pigtail type is preferably smaller than the bending loss of the optical fiber forming the optical fiber coil. The reason is as follows: such leading-out optical fibers are often bent in smaller curvature than the bending curvature of the optical fiber coil so as to permit optional setting of the positions of the pigtail input and output ends in the component and it is thus preferable that the bending loss be suppressed in such cases.

The fiber of the optical fiber coil used is one in which the core does not contain $GeO_2$. This allows low-loss splicing on the occasion of the fusion splicing in the pigtail type.

Figure 39:
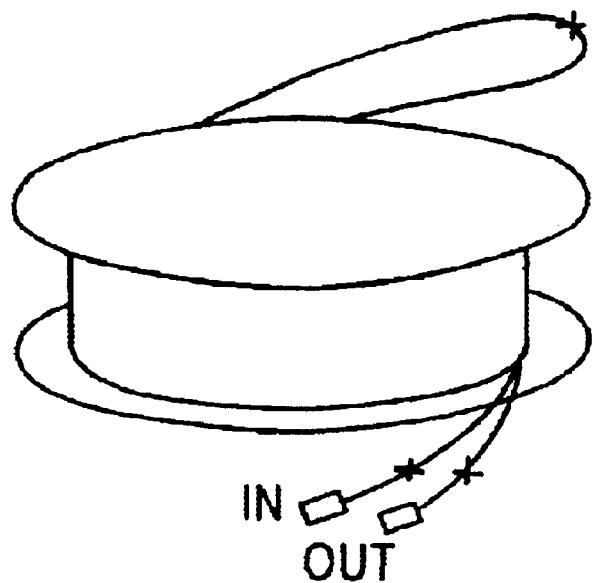
FIG. 39 and FIG. 40 are diagrams each of which shows an example in which the optical fiber coil is placed around the center cylinder.
Figure 40:
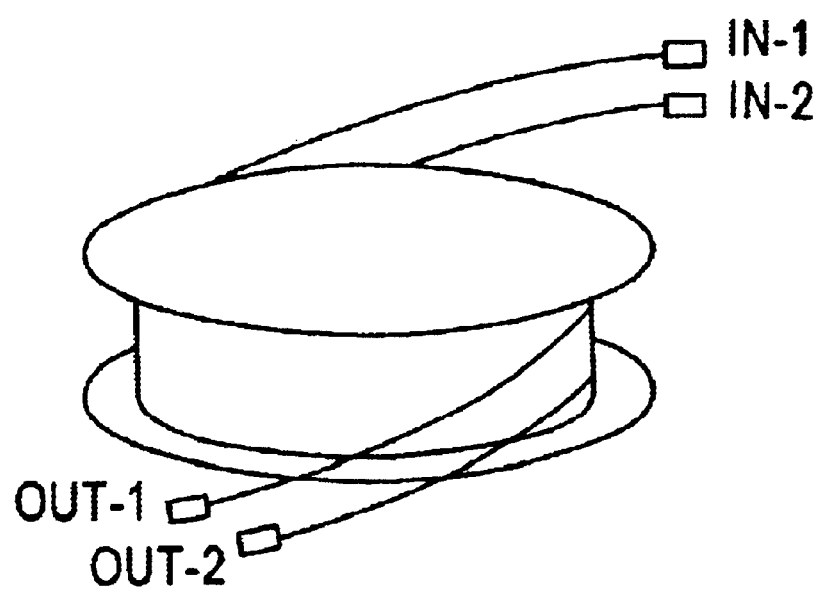

When the optical fiber coil is formed by winding the optical fiber around the center cylinder as in the above fifth embodiment, a plurality of optical fibers can be wound in the same direction around the center cylinder, as illustrated in FIG. 39 and FIG. 40; in FIG. 39 their first ends are spliced and the leading out portions are drawn in the same direction; in FIG. 40 the plurality of optical fibers can form their respective optical fiber coils.

Figure 41:
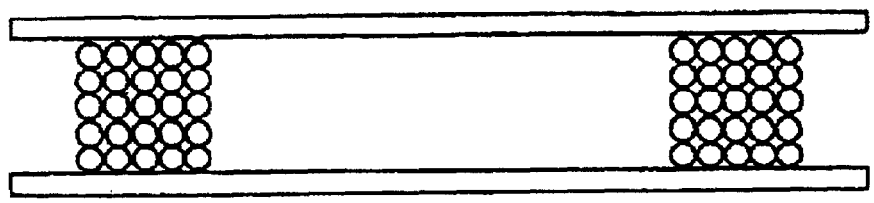
FIG. 41 is a diagram to show an aligned state of the optical fiber in the optical fiber coil formed by winding the optical fiber around the center cylinder.

The microbend can be decreased by aligning the optical fiber as illustrated in FIG. 41 while the optical fiber is wound around the center cylinder.

Figure 42:
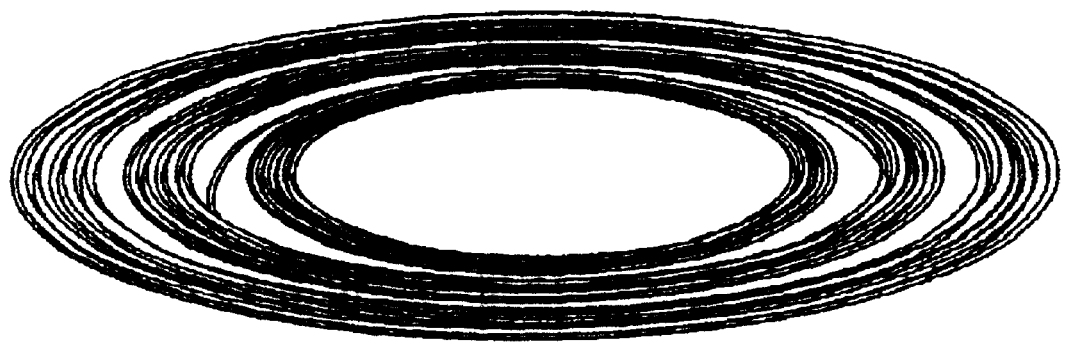
FIG. 42 is a diagram to show an example in which a plurality of optical fiber coils are arranged concentrically.
Figure 43:
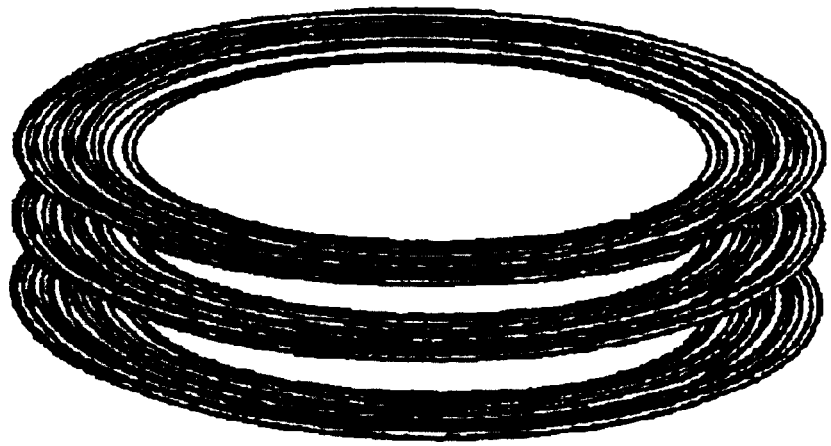
FIG. 43 is a diagram to show a layout example in which a plurality of optical fiber coils are stacked along the center axis of the coil shape.

In another example, a plurality of optical fiber coils are used, and they are arranged concentrically in the height and lateral directions (on the plane normal to the center axis of the coil shape) as illustrated in FIG. 42, thereby achieving efficient utilization of the space. In another example a plurality of optical fibers are stacked as illustrated in FIG. 43, thereby increasing the space efficiency. The plurality of optical fiber coils in these examples may also be used while being set in a container case.

In the above embodiments, the optical fibers optically coupled to the optical fiber coil are preferably Hytrel coated fiber.

On the occasion of winding the optical fiber into the coil form in the above embodiments, the optical fiber is preferably twisted 900 per meter or more. Normally, the polarization mode dispersion of not more than 0.5 ps/km is required for the optical fibers for communication. The polarization dispersion of the optical fiber depends upon the type of the optical fiber and the core noncircularity of the optical fiber, and the type of the optical fiber with the greatest polarization dispersion is DCF. The core noncircularity of the DCF is at most about 1%. Even in the ease of such DCF with the core noncircularity of about 1%, mode coupling is promoted between polarization modes by giving the twist of 90° per meter, whereby the polarization dispersion of not more than 0.5 ps/rkm can be realized.

The foregoing embodiments mainly relate to cases where a double-cladding type DCF is used for making a dispersion compensator. Without being restricted thereto, the present invention is similarly applicable to double-core type and segmentedcore type DCFs as well.

The wavelength band of 1.55 μm is employed in the forgoing embodiments, but the wavelength band over 1.50 m can be also applied to the foregoing embodiments and in this case, the advantage similar to that of the forgoing embodiments can be obtained.

In the prior art, it has been impossible to make a dispersion compensator at a practical level having a smallsized coil with a diameter of 100 mm or smaller. In accordance with the present invention, by contrast, a DCF in a small-sized coil form can be accommodated in a storage case in a state substantially released from distortions in winding, whereby it is possible to realize a smallsized dispersion compensator whose transmission loss and temperature dependence of transmission loss are reduced.

While Japanese Patent Application Laid-Open No. 62-91810 discloses an invention in which the interstices and surroundings of an optical system including an optical coupling section between an optical fiber and an optical device are filled with a resin, which is then solidified so as to encapsulate the optical system therewithin, it fails to describe or suggest reduction in the lateral pressures caused by the turns of the optical fiber acting on each other. On the other hand, while Japanese Patent Application Laid-Open No. 8-75477 discloses an invention which is excellent in vibration characteristics, it similarly fails to describe or suggest reduction in lateral pressures.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber coil comprising:
a first optical fiber being wound so as to have a coil part with a coil shape and having a bundle form in said coil part; and
a resin inserted between parts of said first optical fiber in said bundle form, which are adjacent to among them,
wherein a quarter cone penetration of said resin, which is defined in JIS K 2220 (Japanese Industrial Standard), is between 5 and 200 both inclusive at 25° C.

2. An optical fiber coil comprising:
a first optical fiber being wound so as to have a coil part with a coil shape and having a bundle form in said coil part; and
a resin inserted between parts of said first optical fiber in said bundle form, which are adjacent to among them,
wherein a quarter cone penetration of said resin, which is defined in JIS K 2220 (Japanese Industrial Standard), is not less than 5 at −40° C. and not more than 200 at 100° C.

3. The optical fiber coil according to claim 1, wherein said first optical fiber coil has no bobbin.

4. The optical component according to claim 1, further comprising a housing case, wherein said optical fiber coil is placed in said housing case and said resin is placed in said housing case.

5. The optical fiber coil according to claim 1, wherein said first optical fiber is released in the bundle form.

6. The optical fiber coil according to claim 4, wherein said optical fiber coil is formed by falling said wounded optical fiber into said housing.

7. The optical fiber coil according to claim 1, wherein at wavelengths in a used wavelength region, at least one of chromatic dispersion coefficient and chromatic dispersion slope of said first optical fiber has a negative value.

8. The optical fiber coil according to claim 7, wherein said used wavelength region is not less than the wavelength of 1.50 μm.

9. The optical fiber coil according to claim 1, wherein said first optical fiber has a coated layer, and said coated layer comprises a thin film having at least one function of improving of the strength of the first optical fiber and a function of restraining hydrogen from intruding into a glass of said first optical fiber.

10. The optical fiber coil according to claim 9, wherein said thin film is made of a carbon.

11. The optical fiber coil according to claim 9, wherein said first optical fiber has a coating layer on said thin film.

12. The optical fiber coil according to claim 1, further comprising; a second optical fiber having a connection portion through which said second optical fiber is connected, wherein said second optical fiber is different from said first optical fiber.

13. The optical fiber coil according to claim 12, said first optical fiber and said second optical fiber are fusion-spliced to said second optical fiber at said connecting portion to each other.

14. The optical fiber coil according to claim 12, wherein bending loss of said first optical fiber is smaller than that of said second optical fiber.

15. The optical fiber coil according to claim 12, wherein said second optical fiber is designed for the 1.55 μm band operation and its core does not contain $GeO_2$.

16. The optical fiber coil according to claim 12, wherein said second optical fiber is a Hytrel-coated fiber.

17. The optical fiber coil according to claim 1, wherein said optical fiber coil is comprised of two optical fiber coils, and wherein first ends thereof are spliced to each other and second ends thereof not spliced are drawn from a common end side of the optical fiber coils.

18. An optical fiber coil comprising:
a first optical fiber being wound so as to have a coil part with a coil shape and having a bundle form in said coil part; and
a resin inserted between parts of said first optical fiber in said bundle form, which are adjacent to among them,
wherein a quarter cone penetration of said resin, which is defined in JIS K 2220 (Japanese Industrial Standard), is between 5 and 200 both inclusive at 25° C., and
wherein an amount of hydrogen evolving from said resin is not more than 0.001 ml/g during a thermal treatment of 60° C.×24 hours.

19. The optical fiber coil according to claim 1, wherein a refractive index of said resin is larger than that of a cladding of said first optical fiber.

20. The optical fiber coil according to claim 1, wherein said resin contains a hydrogen absorber.

21. The optical fiber coil according to claim 1, wherein at wavelengths in a used wavelength region, said first optical fiber has bending loss of not less than 1 dB/m when bent in the diameter of 20 mm.

22. The optical fiber coil according to claim 1, wherein the diameter of the coating of said first optical fiber is not more than 150 μm.

23. The optical fiber coil according to claim 1, wherein a coating of said first optical fiber is an ultraviolet-curing resin and the Young's modulus thereof is 0.1–20 kg/mm².

24. The optical component according to claim 1, wherein the cladding diameter of said first optical fiber is not more than 100 μm.

25. The optical fiber coil according to claim 1, wherein said optical fiber coil comprises aligned windings.

26. The optical fiber coil according to claim 1, wherein a plurality of said optical fiber coils are set in one housing case.

27. The optical fiber coil according to claim 1, wherein said first optical fiber is twisted by 90° or more per meter.

28. The optical fiber coil according to claim 1, wherein the shape of said optical fiber coil is noncircular.

29. The optical fiber coil according to claim 1, wherein a pull-out force of said first optical fiber is not more than 120 g.

30. The optical fiber coil according to claim 1, wherein a clearance of not less than 1 μm is present between a glass part and coating layer of said first optical fiber.

31. The optical fiber coil according to claim 1, said optical fiber coil being a dispersion compensator for decreasing chromatic dispersion in a wavelength region of not less than the wavelength of 1.50 μm in an optical fiber transmission line,
wherein said optical fiber coil is an optical fiber coil obtained by winding a long optical fiber having chromatic dispersion coefficient and chromatic dispersion slope of an opposite sign to that of an optical fiber forming said optical fiber transmission line, by a plurality of turns, and making the optical fiber coil in a bundled state while decreasing transmission loss increase in the wavelength region of not less than the wavelength of 1.50 μm due to the winding by 0.1 dB/km or more.

32. The optical fiber coil according to claim 1, wherein said resin has a Young's modules not greater than 0.5 kg/mm².

* * * * *